3,265,737
BORON AMINES AND PROCESS FOR
FORMATION THEREOF
Norman E. Miller, Vermillion, S. Dak., assignor to E. I. du Pont de Nemours and Company, Wilmington, Del., a corporation of Delaware
No Drawing. Filed Nov. 3, 1964, Ser. No. 408,690
26 Claims. (Cl. 260—583)

This application relates to processes for preparing boron compounds and to new products obtained thereby, and is a continuation-in-part of my prior copending applications Serial No. 183,677, filed March 29, 1962, and Serial No. 99,015, filed March 28, 1961, which is the parent application of said Serial No. 183,677, said applications now abandoned. It also relates to a process for preparing polyhydrododecaborates and to a new class of polyhydrododecaborates.

Compounds of boron and hydrogen have achieved technical importance in recent years. The growing interest in these compositions has stimulated an intensive study of processes for obtaining a wide range of boron compounds, particularly compounds having a plurality of boron and hydrogen atoms. Many boron compounds that contain nitrogen, e.g., the amine-borane addition compounds and the borazoles, are hydrolyzed by contact with water or protonic solvents. The "diammoniate of borane," referred to as $B_2H_6 \cdot 2NH_3$ and as $(BH_2 \cdot 2NH_3)BH_4$, is especially sensitive to traces of water [see, for example, Nordham and Peters, J. Am. Chem. Soc. 81, 3552 (1959)]. The pyridine adduct of $BI_3$, i.e. $(C_5H_5N)_2BI_3$, is decomposed almost immediately by contact with water [see Muetterties, J. Inorg. Nucl. Chem. 15, 182 (1960)]. Compounds of this type are lacking in the stability which is desired for many industrial applications.

A need exists for boron compositions which possess excellent hydrolytic stability and high resistance to oxidative decomposition. The present invention provides compounds containing boron and nitrogen which possess unusual and unexpected stability.

It has now been found that polyhedral polyhydropolyborates, including dodecahydrododecaborates(2−), i.e., $B_{12}H_{12}^{-2}$ anions, and a hitherto unknown class of polyhydrododecaborates which are represented by the formula $(B_{12}H_{11}NRR^IR^{II})^-$, are obtained by heating a tertiary amine-borane addition compound ($BH_3$—$NRR^IR^{II}$) with a boron hydride of the formula $B_bH_{b+4}$ where $b$ is 2, 5 or 10 to a temperature at which hydrogen is released as a by-product of the reaction, i.e. to about at least 75° C.

It has also been found that, ordinarily, the cation associated with the polyhydrododecaborate anions is the corresponding substituted ammonium cation. However, when R, $R^I$, and $R^{II}$ fall within certain limits, defined below, a cation of the formula $(BH_2 \cdot mCH_3NR^{IV}R^V)^+$ is obtained.

By metathetical cation exchange methods, the cations obtained with the novel anion, $(B_{12}H_{11}NRR^IR^{II})^-$ can be replaced with any cation (M). Thus one generic formula of novel compounds of this invention is represented by the formula $$M(B_{12}H_{11}NRR^IR^{II})_n$$

In addition, the novel anions can be substituted with halogen (X) by replacement of a hydrogen bonded to boron. Thus, in the broadest sense, the compounds of this invention can be represented by the formula $$M(B_{12}H_{11-y}X_yNRR^IR^{II})_n$$

In a similar manner the hydrogens bonded to the boron of the cation $(BH_2 \cdot mCH_3NR^{IV}R^V)^+$ can be replaced with halogen or fluorosulfato (X′) to form the novel cation $(BH_{2-y'}X'_{y'} \cdot mCH_3NR^{IV}R^V)^+$.

By anion exchange methods the novel cation can be obtained in conjunction with any anion (Z) to form the generic compound $(BH_{2-y'}X'_{y'} \cdot mCH_3NR^{IV}R^V)_{n'} \cdot Z$ wherein $n'$ is a positive whole number equal to the valence of Z.

The foregoing formulas and symbols will be explained in greater detail below.

DISCUSSION OF $BH_3 \cdot NRR^IR^{II} + B_bH_{b+4}$ PROCESS

Boron hydrides which are employed as one reactant in the process are diborane ($B_2H_6$), pentaborane ($B_5H_9$) and decaborane ($B_{10}H_{14}$). These boron hydrides are commercially available products and can be used as marketed without special purification. Because of availability and ease of reaction, diborane is preferred.

The tertiary amine-borane addition compounds (also called tertiary amine-borines), which are used as the second reactant in the process, contain a characteristic group which is

The groups R, $R^I$, $R^{II}$, $R^{IV}$ and $R^V$ in the anions and cations of this invention are derived from the tertiary amine-borane used. Thus, the tertiary amine-borane reactants have the following general formula

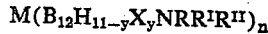

wherein $RR^IR^{II}N$ represents the tertiary amine from which the borane addition compound is derived.

R and $R^I$ in the above formulas are defined as aliphatically saturated (i.e., free of olefinic or acetylenic unsaturation) hydrocarbon groups.

$R^{II}$ is defined as an aliphatically saturated hydrocarbon group that can contain at most one diloweralkylamino (preferably dimethylamino) group bonded to carbon at least once removed from the carbon bonded to nitrogen.

Each group is joined to the nitrogen by singly bonded carbon, i.e., the carbon bonded to the nitrogen is a saturated aliphatic carbon.

The carbon content is not critical, but, solely because of availability, each group is preferably of at most 18 carbons.

In addition, R and $R^I$ can be joined to form a ring with the amino nitrogen. When so joined R and $R^I$ can be alkylene of 4–6 carbons, ethereal oxygen-interrupted alkylene of 4–6 carbons, or lower alkylamino (preferably methylamino)-interrupted alkylene of 4–6 carbons.

Thus, classes of tertiary amines from which the adducts are derived, and consequently the $NRR^IR^{II}$ moieties in the final products include trialkylamines, tricycloalkylamines, dialkylmonocycloalkylamines, dialkylmonoaralkylamines, monoalkyldicycloalkylamines, and heterocyclic amines, exemplified by N-alkylopolymethylenimines, N-alkylmorpholines, and N,N′-dialkylpiperazines.

Thus, R and $R^I$ individually can be alkyl, cycloakyl or aralkyl; while $R^{II}$ can be alkyl, cycloalkyl, aralkyl, diloweralkylamino-substituted alkyl, and the like. Preferably R, $R^I$, and $R^{II}$ are each alkyl of up to 8 carbon atoms.

R and $R^I$ joined together can be, for example, the pentamethylene group of an N-alkylpiperidine, the oxydiethylene group of an N-alkylmorpholine, the N-alkyliminodiethylene group of an N,N′-dialkylpiperazine, or the tetramethylene group of an N-alkylpyrrolidine.

As previously stated, when R, $R^I$, and $R^{II}$ are certain groups the $(BH_2 \cdot mCH_3NR^{IV}R^V)^+$ cation is formed. These groups are necessarily small due to steric hinderance. Thus, R becomes —$CH_3$; $R^I$ becomes $R^{IV}$ which is defined as alkyl of up to four carbons; and $R^{II}$ becomes $R^V$ which is defined as alkyl of up to four carbons which bears at most one dimethylamino group bonded to carbon at least once removed from the carbon bonded to nitrogen. $R^{IV}$ and $R^V$ joined together represent a divalent radical of the formula —$CH_2CH_2QCH_2CH_2$— where Q is —$CH_2$— or —$N(CH_3)$—. $R^{IV}$ and $R^V$ are further limited in that the carbon bonded to the tertiary nitrogen is bonded to at most one other carbon atom. $m$ is a positive whole number equal to 2 divided by the number of nitrogen atoms in the $CH_3NR^{IV}R^V$ moiety. Preferably $R^{IV}$ and $R^V$ are methyl groups.

Specific illustrations of tertiary amines which form the $RR^IR^{II}N$ group are trimethylamine, methyldiethylamine, tributylamine, tri(2-ethylhexyl)amine, trioctadecylamine, tricyclohexylamine, methyldicyclohexylamine, butyldioctylamine, butyldicyclohexylamine, N-butylmorpholine, N-dodecylmorpholine, N-ethylpiperidine, dimethylisopropylamine, dimethyl (β-phenylethyl)amine, and the like.

As shown above, the tertiary nitrogen compounds which can be employed to form the amine-borane adduct reactant are not limited to monobasic compounds. Compounds having two tertiary basic nitrogen atoms are operable e.g., N,N,N',N'-tetramethyl-1,2-diaminoethane, N,N,N',N',-teraethyl-1,3, - diaminopropane, N,N,N',N'-tetramethyl-1,6-diaminohexane, N,N' - diethylpiperazine. These compounds are included within the definition of the $BH_3 \cdot NRR^IR^{II}$ reactant, it being understood that addition compounds derived from these amines will have a $BH_3$ bonded to each tertiary nitrogen.

The radicals attached to tertiary nitrogen are, therefore, monovalent radicals and divalent radicals, in that the divalent radicals act as a bridge between two tertiary nitrogens or may form a ring with one tertiary nitrogen. Where two divalent radicals form bridges between two tertiary nitrogens, a rings is formed having two annular nitrogen atoms, e.g., piperazine. The divalent radicals may be interrupted by an oxygen, whereupon a ring such as morpholine is formed.

For the preparation of the novel anions with the $(BH_2 \cdot 2CH_3NR^{IV}R^V)^+$ cation, it is seen that the tertiary amine-borane reactant used will have the formula $BH_3 \cdot CH_3NR^{IV}R^V$.

Tertiary amine-borane addition compounds are a known class of products obtained by the direct reaction of a tertiary amine with diborane at relatively low temperatures. These addition compounds can be prepared and isolated for subsequent use in the reaction with a boron hydride. The preparation of representative amine-borane adducts, e.g., $(CH_3)_3N$—$BH_3$, is described by Wiberg et al., Zeit. Anorg. U. Allgem, Chem. 256, 285–306 (1948). The compound can be prepared in situ in the reaction chamber and need not be purified or isolated. In this mode of operation the addition compound, without purification, is reacted at the desired temperature with a further quantity of diborane or with a different boron hydride, i.e., pentaborane or decaborane.

With diborane as the boron hydride, the process is advantageously operated by supplying diborane continuously or in sufficient quantity to the tertiary amine at an elevated temperature to form the dodecahydrododecaborate in one step. This method of operation falls within the scope of the present invention and it is, in fact, a preferred procedure in view of the availability of diborane and tertiary amines and the ease with which it can be performed.

The mechanism of the reaction is not clearly understood. Initially, to obtain the tertiary amine-borane adduct, diborane and the tertiary amine are mixed at a convenient temperature, generally not over 35° C., and at atmospheric or subatmospheric pressure. If desired, temperatures as low as —80° C. or lower can be employed. This step, which is preliminary in the process, may be represented by the following equation:

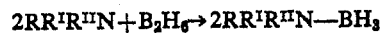

$$2RR^IR^{II}N + B_2H_6 \rightarrow 2RR^IR^{II}N\text{—}BH_3$$

In this step, no volatile by-products are obtained. The reaction is solely addition to form a neutral and non-ionic product. This reactant is then heated to an elevated temperature (at least 75° C.) with a boron hydride which can be diborane (the same boron hydride used for preparing the adduct), pentaborane or decaborane. By employing diborane as the boron hydride in both steps, the tertiary amine and diborane can be reacted and heated to an elevated temperature in one operation to yield the polyhydrododecaborate salts, i.e., the amine and a part of the diborane are employed as precursors to form the addition compound in situ. A gaseous by-product is hydrogen and, as stated earlier, the formation of by-product hydrogen is a characteristic feature of the reaction. The quantity of hydrogen which is formed can be used as an approximate measure of the completeness of the reaction.

It is essential in the operation of the process to heat the reaction mixture to a minimum effective temperature to bring about the desired formation of the polyhydrododecaborate salts, which occurs with rapid hydrogen evolution. The minimum effective temperature is about 75° C., for example, with triethylamine-borane and diborane, but this temperature will, of course, vary somewhat with pressure and with the reactivity of the particular tertiary amine-borane and boron hydride reactants which are used. As is to be expected, an increase in temperature leads to a more rapid rate of reaction. The process is operable at temperatures up to 400° C. or even higher. Excessively high temperatures of operation provide no advantage and may lead to undesirable side reactions. Temperatures which lie between about 100° and 300° C. are preferred. An especially preferred temperature range is between about 100° and 250° C. Heating of the reactants may be accomplished by any suitable means. The temperature may be raised by a stepwise procedure or the desired temperature may be reached by a one-step procedure.

Pressure is not a critical factor in the operation of the process, i.e., the process is operable at subatmospheric, atmospheric and superatmospheric pressures. It is advantageous to maintain the reactants in intimate contact with each other during the process and, for this reason, the process can be conducted profitably under superatmospheric pressures when a volatile boron hydride, such as diborane, is employed as one reactant. Thus, pressures up to 500 atmospheres (absolute) or even higher are operable. Generally, for convenience of operation, a pressure of at least 5 atmospheres is employed with volatile boron hydrides, e.g., diborane, and tertiary amines to maintain good contact between the reactants and thereby obtain good yields of the polyhydrododecaborates. Accurate control of pressure is not necessary and, in the event a closed reaction vessel is employed, the autogenous pressure obtained in the heating step is conveniently used. Pressures above atmospheric can be obtained by any suitable means. The boron hydride can be used in excess, if desired, or it can be mixed with inert gases such as nitrogen, argon, helium, and the like.

The mole ratio in which the reactants are used is not critical. Preferably, the ratio of moles of boron hydride/moles tertiary amine-borane adduct is at least 1. With diborane and a tertiary amine as reactants, the ratio of moles diborane/moles tertiary amine is preferably greater than 1. To obtain high yields of polyhydrododecaborates, it is desirable although not essential to use the boron hydride in considerable excess, particularly when diborane is employed as the reactant. Thus, with diborane, the ratio of moles $B_2H_6$/moles tertiary amine can be 2, 3, 4, 5, or even higher. The use of excess boron hydride permits maximum utilization of the basic nitrogen reactant or the tertiary amine-borane adduct. The mole ratio in which the reactants are present in the reaction zone will be determined to a large extent by the method which is used, i.e., whether batch, continuous or a combination of the two methods.

In the operation of the process, a reaction vessel is used whose inner surfaces are made of corrosion-resistant material, e.g., commercially available stainless steels, platinum, glass, and the like. Conventional vessels or pressure-resistant vessels can be employed. The reaction is preferably conducted under substantially anhydrous conditions and the vessel is generally flushed with an inert gas prior to charging with the reactants. It is then charged with the tertiary amine-borane adduct. Optionally, with diborane as the boron hydride, the vessel is charged with the tertiary amine. In the event a pressure vessel is employed, it can be cooled to a low temperature, e.g., with solid carbon dioxide-acetone mixtures, liquid nitrogen, liquid helium, and the like, and it is optionally evacuated to a low pressure to facilitate charging with a volatile boron hydride. Cooling and evacuation are not essential steps, however. The desired quantity of boron hydride is charged into the vessel, following which it is closed. Vessel and contents are then heated to the desired temperature with agitation.

To conduct the process at atmospheric pressure, the reaction vessel can be fitted (1) with a gas inlet tube to lead the volatile boron hydride below the surface of the tertiary amine-borane adduct, (2) with a reflux condenser to return boiling liquids to the reaction chamber, and (3) a cold trap (cooled to $-80°$ C. or lower) joined to the reflux condenser to collect volatile products which are formed during the reaction.

With a boron hydride of low volatility, e.g., decaborane, the tertiary amine-borane adduct and the boron hydride are simply mixed and heated to reaction temperature, i.e., until rapid release of hydrogen occurs with formation of the desired products.

The procedures described above can be modified or changed as required by convenience or circumstances. It is not essential to conduct the reaction in any particular sequence of steps or by any specific procedure.

Mixing of the reactants during the operation of the process is desirable although not essential. Mixing can be accomplished by any suitable means, e.g., by mechanical stirring, shaking, or tumbling of the entire reactor.

The time of the reaction is not critical. In a batch process, the time will generally lie between about 1 hour and about 50 hours. In general, a reaction time of 5 hours to 25 hours is sufficient for a batch operation. For a continuous process, much shorter reaction times can be used and unreacted components can be recirculated for further exposure in the reaction zone.

In an optional method of operation of the process, the reaction between the boron hydride and the tertiary amine-borane adduct is conducted in the presence of an inert solvent, i.e., a liquid which is not decomposed under the conditions of the reaction by the components of the process or by the products which are obtained. In many cases the adduct is a liquid at the temperature of the reaction and it can serve both as a solvent and reactant. The use of a solvent is not essential for operability and its use is based solely on convenience of operation. Solvents, in the event they are employed, are preferably liquids at the operating temperatures and they are in most cases liquids at prevailing atmospheric temperature. Hydrocarbons are particularly useful as solvents, e.g., n-hexane, cyclohexane, benzene, toluene, and the like.

In working up the reaction products, the volatile by-products are generally removed by passing them into a trap cooled to a very low temperature (e.g., liquid nitrogen temperature). Hydrogen, as stated earlier, is a by-product and it is removed with any other volatile products which may be present. Suitable precautions should be observed in venting pressure-reaction vessels in view of possible flammability or toxic hazards of the volatile inhalation of fine powders.

The reaction products, remaining after removal of volatile products, are generally liquids or solids. The principal products, i.e., the polyhydrododecaborates, can be separated and purified by conventional procedures, e.g., filtration, crystallization, solution chromatography, and the like. The products should be handled with the customary precautions observed in handling chemical compounds to prevent undue contact with the skin or inhalation of fine powders.

PRODUCTS CONTAINING THE $(B_{12}H_{11} \cdot NRR^IR^{II})$—ANION

As previously stated, the initial products will be of two types, viz, (1) $RR^IR^{II}NHB_{12}H_{11}NRR^IR^{II}$ or (2) $[BH_2 \cdot mCH_3NR^{IV}R^V][B_{12}H_{11}NCH_3R^{IV}R^V]$ These constitute the preferred products of the invention.

By metathetical cation exchange, a wide range of salts can be obtained from them. Thus, compounds containing the novel anion have the formula $$M(B_{12}H_{11}NRR^IR^{II})n$$

where M is a cation, $n$ is a positive whole number whose value is equal to the valence of M, and R, $R^I$ and $R^{II}$ are as previously defined.

In the formula immediately above, the term "cation" has reference to an atom or group of atoms which in aqueous solution forms a positively charged ion. Examples of suitable cations include hydrogen (H+), hydronium ($H_3O^+$), a metal, ammonium ($NH_4^+$), hydrazonium ($NH_2-NH_3^+$), N-substituted ammonium, N-substituted hydrazonium, metal-amine complexes, $$BH_2 \cdot 2N(CH_3)_3{}^+$$

and the like.

Metal cations in the compounds can be derived generally from any metal. The metals according to the Periodic Table in Deming's "General Chemistry," 5th ed., chapter 11, John Wiley & Sons, Inc., and in Lange's "Handbook of Chemistry," 9th ed., pp. 56–57, Handbook Publishers, Inc. (1956), are the elements of Groups I, II, VIII, III–B, IV–B, V–B, VI–B, VII–B and the elements of Groups III–A, IV–A, V–A, and VI–A which have atomic numbers above 5, 14, 33 and 52, respectively. These metals include both light and heavy metals. The light metals are also known as the alkali metals and the alkaline earth metals. The heavy metals include brittle, ductile and low-melting metals as described in the above-mentioned Periodic Table in Lange's "Handbook of Chemistry."

Preferred metal cations are derived from the elements of Groups I–A, II–A, I–B and II–B having an atomic number up to and including 80.

Most preferred metals for use are the light metals (the alkali and alkaline earth metals of Groups I–A and II–A) having an atomic number less than 87, i.e., lithium, sodium, potassium, rubidium, cesium, beryllium, magnesium, calcium, strontium, and barium.

Examples of N-substituted ammonium radicals include those having the formulas $R^{III}NH_3^+$, $R^{III}{}_2NH^+{}_2$, $R^{III}{}_3NH^+$, $R^{III}{}_4N^+$, and the like, wherein $R^{III}$ represents an organic group bonded to nitrogen. The $R^{III}$ groups are not critical features of these cation groups; thus, $R^{III}$ can be an open-chain, closed-chain, saturated or unsaturated hydrocarbon or substituted hydrocarbon group, or R be a heterocyclic ring of which the nitrogen atom is a component part, such as pyridine, quinoline, morpholine, hexamethylenimine, and the like. Preferably, $R^{III}$, for reasons of availability of reactants, contains not more than 18 carbon atoms. $R^{III}$ can be, for example, methyl, 2-ethylhexyl, octadecyl, allyl, cyclohexyl, cyclohexenyl, phenyl, naphthyl, anthryl, cyclohexylphenyl, diphenylyl, benzyl, chloroethyl, ω-cyanoamyl, β-hydroxyethyl, p-hydroxyphenyl, and the like.

Examples of N-substituted hydrazonium radicals include those having the formulas $(R^{III}NHNH_3)^+$, $(R^{III}{}_2N-NH_3)^+$, and the like, wherein $R^{III}$ has the same significance as indicated in the preceding paragraph. To illustrate, the hydrazonium cation can be derived from phenylhydrazine, methylhydrazine, 1,1-dimethylhydrazine, ethylhydrazine, 1,1-diethylhydrazine, and similar compounds.

The valence of the cation M will be between 1 and 4, i.e., M can have a valence of 1, 2, 3, or 4. In most cases the valence of M will be 1 or 2 and this group of compounds in which the valence of M is at most 2 are readily preparable and so form a preferred group of compounds in this invention.

A few typical examples of the new class of compounds derived directly in the process employing the tertiary amine-borane adducts are $(CH_3)_3NHB_{12}H_{11}N(CH_3)_3$,
$(C_8H_{17})_3NHB_{12}H_{11}N(C_8H_{17})_3$,
$(C_{12}H_{25})_3NHB_{12}H_{11}N(C_{12}H_{25})_3$,
$(C_6H_{11})_3NHB_{12}H_{11}N(C_6H_{11})_3$,
$(CH_3)(C_6H_{11})_2NHB_{12}H_{11}N(CH_3)(C_6H_{11})_2$,
$(iso-C_3H_7)_3NHB_{12}H_{11}N(iso-C_3H_7)_3$,
$(iso-C_4H_9)_3NHB_{12}H_{11}N(iso-C_4H_9)_3$, N-methylmorpholinium $B_{12}H_{11}$(N-methylmorpholine), and the like.

The tertiary ammonium salts can be passed in aqueous or alcoholic solution through an acid ion exchange resin to yield a solution of the free acid $HB_{12}H_{11}NRR^IR^{II}$ where R, $R^I$ and $R^{II}$ are as previously defined. The acid is comparable in strength to common mineral acids and it is most conveniently used in solution.

A broad range of salts are obtained by neutralizing aqueous or alcoholic solutions of the acids.

The acids can be neutralized with alkali metal hydroxides (LiOH, NaOH, KOH), alkaline earth metal hydroxides [Ba(OH)$_2$, Ca(OH)$_2$], ammonia, ammonium hydroxide, metal-ammine hydroxides, hydrazine, substituted hydrazines (phenylhydrazine, N,N-dimethylhydrazine), sulfonium hydroxides [(CH$_3$)$_3$SOH, $(C_4H_9)_3SOH]$ phosphonium hydroxides [(C$_4$H$_9$)$_4$POH], tetraalkyl and mixed tetraaryl and alkyl-substituted ammonium hydroxides [(CH$_3$)$_4$NOH, (C$_6$H$_5$CH$_2$)(CH$_3$)$_3$NOH]. The compounds given in brackets are illustrative of the class of bases named.

The acid in aqueous or alcoholic solution can be agitated with inorganic oxides, hydroxides or carbonates to form metal or metal oxy salts of the $(B_{12}H_{11}NRR^IR^{II})^-$ anion. To illustrate, the solution of the acid can be reacted with Na$_2$CO$_3$, CaCO$_3$, SrCO$_3$, Zn(OH)$_2$, V(OH)$_3$, Cr(OH)$_3$, Mn(CO$_3$)$_2$, FeCO$_3$, NiCO$_3$, Cu(OH)$_2$, ZnCO$_3$, Al(OH)$_3$, Sn(OH)$_4$, PbCO$_3$, (SbO)$_2$CO$_3$, (BiO)$_2$CO$_3$, and the like to obtain the corresponding metal salts.

Examples of these new compounds are as follows:

$LiB_{12}H_{11}N(ethyl)_3$, $NaB_{12}H_{11}N(propyl)_3$,
$KB_{12}H_{11}N(butyl)_3$, $Mg[B_{12}H_{11}N(octyl)_3]_2$,
$Ca[B_{12}H_{11}N(cyclohexyl)_3]_2$, $Ba[B_{12}H_{11}N(dodecyl)_3]_2$,
$Ti[B_{12}H_{11}N(ethyl)_3]_3$, $V[B_{12}H_{11}N(methyl)_3]_3$,
$Mo[B_{12}H_{11}(N-methylmorpholine)]_3$,
$Mn[B_{12}H_{11}(N-methylpyrrolidine)]_2$,
$Fe[B_{12}H_{11}N(ethyl)_3]_3$, $Co[B_{12}H_{11}N(isopropyl)_3]_2$,
$Ni(B_{12}H_{11}N(2-ethylhexyl)_3]_2$,
$Cu[B_{12}H_{11}N(methyl)(cyclohexyl)_2]_2$,
$Al[B_{12}H_{11}N(C_2H_5)_3]_3$, $Pb[B_{12}H_{11}N(\beta-phenylethyl)_3]_2$,
$Sb[B_{12}H_{11}N(ethyl)_3]_3$, $NH_4B_{12}H_{11}N(butyl)_3$,
$CH_3NH_3B_{12}H_{11}N(methyl)_3$, $C_6H_5NH_3B_{12}H_{11}N(ethyl)_3$,
$(C_8H_{17})_2NH_2B_{12}H_{11}N(hexyl)_3$,
$(C_4H_9)_3NHB_{12}H_{11}N(ethyl)_3$,
morpholinium $B_{12}H_{11}N(hexyl)_3$,
$NH_2NH_3B_{12}H_{11}N(C_4H_9)_3$,
$C_6H_5NHNH_3B_{12}H_{11}N(isopropyl)_3$,
$(CH_3)_2NNH_3B_{12}H_{11}N(ethyl)_3$,
$(C_4H_9)_4PB_{12}H_{11}N(isobutyl)_3$,
$(C_2H_5)_3SB_{12}H_{11}N(isoamyl)_3$,
$(CH_3)_3(C_6H_5CH_2)NB_{12}H_{11}N(C_2H_5)_3$, and $(CH_3)_4NB_{12}H_{11}N(C_3H_7)_3$ The above compounds are made by one or more of the metathetical processes which have been described previously, i.e., neutralization of the acid with an appropriate base which has the cation group, or reaction of the acid with an oxide, hydroxide or carbonate bearing the desired cation. Other types of metathetical processes can be employed to prepare the compounds of the invention, e.g., reaction between salts to effect an exchange of cations. A water-soluble salt, e.g., cesium fluoride, can be reacted with a water-soluble derivative bearing the $B_{12}H_{11}NRR^IR^{II}$ anion, e.g., $NH_4B_{12}H_{11}N(C_2H_5)_3$, to form a salt of lesser solubility in water, in this case, $CsB_{12}H_{11}N(_2H_5)_3$.

These new compounds are generally white crystalline solids which are stable under normal atmospheric conditions. They can be stored in conventional containers made, e.g., of glass polyethylene, polystyrene, and the like, for long periods without decomposition. The free acids are generally hygroscopic and, for this reason, they are most conveniently handled in aqueous solution.

The compounds show much greater chemical stability than many of the known hydrogen-containing boron compositions. The boron-containing group functions as a unit in many chemical reactions and its behavior suggests that the boron atoms are joined to form a boron cage or boron sphere which, although entirely inorganic in structure, undergoes electrophilic substitution reactions in a manner which resembles the behavior of carbocyclic aromatic compounds, e.g., benzene and naphthalene. Specifically, hydrogens bonded to borons in the compounds containing the novel anion are replaceable by halogen substituents denoted by X in the formula, in the same manner that hydrogen bonded to nuclear carbons in benzene or naphthalene is replaced.

Thus, the products will have the formula $M(B_{12}H_{11-y}X_y \cdot NRR^IR^{II})_n$ where X is halogen, $y$ is a cardinal number of from 0 to 11, and the other symbols are as previously defined. These compounds are soluble in liquids such as methanol and ethanol. The halogen is substituted by reacting the unsubstituted anionic compound with the halogen (fluorine, chlorine, bromine or iodine).

PRODUCTS CONTAINING THE CATION
$(BH_2 \cdot mCH_3NR^{IV}R^V)^+$

As previously stated, when R, $R^I$ and $R^{II}$ of the amine-borane reactant fall within certain limits, the cation of the novel products will be the $(BH_2 \cdot mCH_3NR^{IV}R^V)^+$ cation.

These cation-forming groups show remarkable stability, particularly against hydrolytic and oxidative decomposition. This stability, which will be illustrated later, is in marked contrast to the ease of hydrolysis and degradation of known compounds of the type described earlier, e.g., $B_2H_6 \cdot 2NH_3$ and $BI_3 \cdot 2C_5H_5N$. Compounds of the latter type are decomposed by brief contact with water or with aqueous acid or alkaline solutions. In contrast, the stability of the compounds of the invention is illustrated by the behavior of the group $[BH_2 \cdot 2N(CH_3)_3]^+$. This group is not hydrolyzed or degraded in boiling water, hot aqueous inorganic bases or hot aqueous strong acids. The group is not significantly decomposed in boiling aqueous concentrated nitric acid and it is not degraded by hot solutions which contain oxidizing or reducing agents in the ionic form, e.g., $AuCl_4^-$, $Ag(CN)_2^-$, $BH_4^-$, or $Ag^+$. Even in the presence of elemental fluorine, the cation possesses sufficient stability to yield a compound in which the hydrogens bonded to boron are replaced with fluorine.

The cation group, represented as $(BH_2 \cdot mCH_3NH^{IV}R^V)^+$ functions as a unit and it passes unchanged through metathetic reactions even reactions which employ powerful oxidizing or reducing ionic reagents. In view of this exceptional stability, it is possible to obtain compounds containing this cation having a wide range of Z groups as anions.

The exceptional stability of the cation $$(BH_2 \cdot mCH_3NR^{IV}R^V)^+$$

permits the use of the salts containing it as reagents in substitution reaction wherein one or both hydrogens bonded to boron in the novel cation are replaced with halogen or fluorisulfato by reaction with halogen or peroxysulfuryl difluoride without decomposition or degradation of the boron-containing moiety. The compounds so obtained can bear one or two groups, such replacement groups which are represented as X'. Thus, the general formula of the novel cation of this invention is $$(BH_{2-y'} \cdot X'_{y'} \cdot mCH_3NR^{IV}R^V)^+$$

where X' is halogen or fluorosulfato, y' is a cardinal number of from 1 to 2, and the other symbols are as previously defined.

A preferred group of tertiary amines which are represented as $CH_3NRR^{IV}R^V$ in the compounds is selected from trimethylamine, ethyldimethylamine, diethylmethylamine, N,N,N',N'-tetramethylethylenediamine, 1,N,N,N',N'-pentamethyltrimethylenediamine, N-methylpiperidine, and N,N'-dimethylpiperazine.

To complete the valence charge associated with the novel cation $(BH_{2-y'} \cdot X'_{y'} \cdot mCH_3NR^{IV}R^V)^+$, an anion is needed. This is provided in the initial reaction by the polyhydropolyborate anion $$(BH_{2-y'} \cdot X'_{y'} \cdot mCH_3NR^{IV}R^V)^+$$

i.e., its narrower form $(B_{12}H_{11} \cdot CH_3NR^{IV}R^V)^{-1}$. The anion, denoted by Z, can be any element or group of elements which can form a negative ion, i.e., an anion, in aqueous solution. The group can be monovalent, divalent, trivalent, quadrivalent, or higher; it can be organic or inorganic in character. To illustrate, Z groups, expressed as ions, can be fluoride, chloride, bromide, iodide, hydroxide, nitrate, nitrite, sulfate, chlorate ($ClO_3^-$) phosphate ($PO_4^\equiv$), monohydrogen phosphate ($HPO_4^=$), dihydrogen phosphate ($H_2PO_4^-$), carbonate ($CO_3^=$), bicarbonate ($HCO_3^-$), sulfide ($S^=$), chromate ($CrO_4^=$), acetate, trichloroacetate, trifluoroacetate, butyrate, acrylate, methacrylate, crotonate, dodecanoate, stearate, cyclohexanoate, benzoate, toluate, naphthoate, naphthenate, benzenesulfonate ($C_6H_5SO_3^-$), fluorobenzoate, chlorobenzoate, benzenephosphonate ($C_6H_5PO_3^=$), benzenearsonate ($C_6H_5AsO_3^=$), anthranilate, picolinate, glycinate $[CH_2(NH_2)CO_2^-]$, ε-aminocaproate $[NH_2(CH_2)_5CO_2^-]$, tetrahydroborate ($BH_4^-$), decahydrodecaborate $$(B_{10}H_{10}^=)$$

dodecahydrododecaborate ($B_{12}H_{12}^=$), and the like.

A preferred group of compounds are those in which Z contains a plurality of boron atoms, e.g., $B_3H_8^{-1}$, $B_{10}H_{10}^{-2}$, $B_{11}H_{14}^{-1}$, $B_{12}H_{12}^{-2}$, and the like. Compounds in which Z is —OH or a halide form a valuable group which are easily obtained and they form an especially preferred group. The compounds of this especially preferred group are useful as intermediates in the preparation of other species.

The novel cation-containing compounds are stable crystalline solids which can be stored for prolonged periods without decomposition. They are stored in containers conventionally used for common chemicals, e.g., in containers of glass, metal, polystyrene, poly(tetrafluoroethylene)resin, and the like. Provision for exclusion of air and moisture is not essential although customary precautions against contamination with adventitious material are desirable.

The color of the compounds is determined to some extent by the elements which are present, especially in the anion Z. The color of the compounds is most frequently white with occasional colored products, e.g., yellow or red.

A particularly valuable property of the compounds of the invention is the unusual range of solubilities which are obtained by change in the group Z. In view of these unexpected solubility characteristics, it is possible to prepare solutions containing, e.g., the cation group $$BH_{2-y} \cdot X'_y \cdot 2N(CH_3)_3^+$$

in liquids which range from water to halohydrocarbons.

Compounds in which Z is one of the more common anions are generally very water-soluble and they form solutions which conduct an electric current. To illustrate, the halides (fluoride, chloride, bromide and iodide), sulfate, nitrate, phosphate, chromate, chlorate, carbonate, and the like, dissolve readily in water and they possess limited solubility in other protonic solvents, such as alcohols.

Compounds of the invention in which Z is a relatively large anion are generally sparingly soluble in water but they dissolve to a surprising extent in organic solvents, particularly in nitriles and halohydrocarbons. To illustrate, compounds in which Z is $B_{12}H_{12}^=$, $AuCl_4^-$, $PF_6^-$, and the like are soluble in methylene dichloride, chloroform, and acetonitrile. These compounds are also soluble in dimethylformamide, butyrolactone and similar types of liquids. Unusual solubility charcteristics are not necessarily limited to compounds in which Z is a large anion, e.g., $[BH_{2-y} \cdot X'_y \cdot 2N(CH_3)_3]_2SO_4$ is soluble in methylene chloride as well as in water.

As previously stated, the cation-containing compounds are obtained in the initial reaction when the tertiary amine employed is of a small size sterically.

An alternate preparation for some specific cation-containing compounds is as follows:

Two reactants are employed, (a) a tertiary amine which is trimethylamine; N,N,N,'N' - tetramethylethylenediamine; 1,N,N,N',N'-pentamethyltrimethylenediamine, or N,N'-dimethylpiperazine, and (b) a boron compound of the formula $$[BH_2 \cdot 2S(CH_3)_2]_2B_{12}H_{12}$$

or $$[BH_2 \cdot 2S(CH_3)_2][B_{12}H_{11} \cdot S(CH_3)_2]$$

The tertiary amines employed as reactants are readily available compounds. In most cases, they can be employed as obtained commercially without especial purification.

The boron reactant has not been described in the literature. It is readily prepared by reaction of dimethyl sulfide-borane, i.e., $(CH_3)_2S$—$BH_3$, with $B_2H_6$, $B_5H_9$ or $B_{10}H_{14}$, employing process conditions are described above for the reaction of a tertiary amine with boron hydrides. Products obtained from the $(CH_3)_2S$—$BH_3$ reaction include compounds of the formulas $$[BH_2 \cdot 2S(CH_3)_2]_2B_{12}H_{12}$$

and $$[BH_2 \cdot 2S(CH_3)_2]B_{12}H_{11} \cdot S(CH_3)_2$$

These compounds can be used directly as reactants.

This process is conducted in a simple manner. The tertiary amine and boron reactant, e.g., $$[BH_2 \cdot 2S(CH_3)_2]B_{12}H_{11} \cdot S(CH_3)_2$$

are mixed at a temperature below the boiling point of the amine and the mixture is agitated by any suitable means until the dimethyl sulfide in the cation is displaced by the tertiary amine. Dimethyl sulfide is readily removed from the reaction mixture by volatilization.

The reaction can if desired, be conducted in an inert liquid medium to permit intimate contact of the components. A solvent is advantageously employed when both reactants are solids. Classes of satisfactory solvents are aromatic hydrocarbons, halohydrocarbons, ethers, and nitriles, e.g., benzene, toluene, carbon tetrachloride, chloroform, diethyl ether, anisole, acetonitrile, and the like.

To place X' groups on the $(BH_2 \cdot mCH_3NR^{IV}R^V)^+$ cation, halogens (fluorine, chlorine, bromine, or iodine) or peroxydisulfuryl dihalides are employed. The reaction is conducted in conventional vessels with corrosion-resistant inner surfaces, e.g., glass, platinum, poly(tetrafluoroethylene)resin, and the ilke. The boron-containing reactant and, optionally, a liquid solvent which is inert toward the reactants, is charged into the reaction vessel. The X' producing reagent is then supplied to the reaction vessel at a temperature and at a rate which will provide a controllable reaction and which will bring the reaction to completion within the reasonable time.

The temperature at which the reaction is conducted will be determined largely by the reactivity of the X' producing reagent. In general, the temperature will be between about $-20$ and $200°$ C. Preferably, the temperature will be between about $0°$ and $150°$ C.

The time of reaction in a batch process will also depend to a considerable extent on the reactivity of the reagent. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability.

The reaction can be conducted under pressure, if desired, but it is not essential to use pressure. In most cases the reaction proceeds satisfactorily at atmospheric pressure.

The proportions in which the reactants are used are not critical. It is preferable, in order to obtain maximum yield of desired product, to use at least one mole of reagent for each hydrogen which is to be replaced on the boron-containing reactant. It is not essential, however, that these ratios be used.

The compounds are purified by well known and recognized procedures. For stable products, conventional crystallization procedures are used, employing water or inorganic solvents, e.g., alcohol, benzene, and the like. Solutions of products can be treated with absorptive agents, e.g., activated carbon or silica gel, to absorb the major portion of the impurities.

In the process described above, one or both hydrogens on the boron in the novel cation-containing compounds can be replaced. The groups which replace the hydrogens can be alike or different. To illustrate, the boron-containing reactant can be reacted with one of the reagents, e.g., chlorine, to replace one hydrogen, and the resulting product can be reacted with a second reagent, e.g., bromine or peroxysulfuryl fluoride, to replace the second hydrogen.

The novel cation-containing compounds wherein Z covers a wide range of anions are obtained by simple metathetic reactions employing the substituted boron-containing cations. To illustrate, $$(BH_{2-y} \cdot X'_y \cdot mCH_3NR^{IV}R^{IV})_2B_{12}H_{12}$$

or $$(BH_{2-y} \cdot X'_y \cdot mCH_3NR^{IV}R^V)B_{12}H_{11} \cdot CH_3NR^{IV}R^V$$

is dissolved in water or aqueous alcohol and the solution is contacted with a strong base or a strongly basic ion-exchange resin to obtain a compound wherein Z is OH. In an alternative mode of operation, the solution of boron-containing salt is contacted with a chloride ion-exchange resin and the effluent is reacted with silver oxide. Compounds of the formula $$BH_{2-y} \cdot X'_y \cdot mCH_3NR^{IV}R^VOH$$

are very strong bases and they can be neutralized with acids or salts to obtain compounds of the invention having a wide range of Z groups. Organic as well as inorganic acids or their anhydrides can be employed. For example, the hydroxide salt plus phthalic anhydride yields the phthalate salt; with glycine, the glycinate salt is obtained; with citric acid, the salt formed is the citrate salt; with benzenesulfonic acid, the salt is benzenesulfonate; with benzenephosphonic acid, the benzenephosphonate salt is obtained; with benzenephosphinic acid, the salt is benzenephosphinate; with perchloric acid, the perchlorate salt is formed; with pyrosulfuric acid, the salt is pyrosulfate; and with selenic acid, the salt formed is the selenate. These examples are not limiting but serve to illustrate the wide scope of operable metathetic reactions.

The compounds of the invention and their preparation are illustrated more fully in the following examples.

Example I

A. A pressure vessel of corrosion-resistant steel (capacity, 100 ml.) is charged with 1.6 g. of trimethylamineborane adduct, closed and evacuated to a low pressure (less than 1 mm. of mercury). The vessel is then charged with 1.79 g. of diborane ($B_2H_6$) and sealed. The reaction mixture is heated under autogenous pressure for 10 hours at $125°$ C. with agitation. The vessel is cooled and volatile products are removed by venting. These products are found to contain hydrogen (0.118 mole) and very small amounts of $B_5H_9$ and unreacted $B_2H_6$. A white crystalline solid (2.6 g.) remains in the reaction vessel. The solid is extracted with boiling water, leaving 0.8 g. of insoluble white material which is called Fraction A and which is discussed in a subsequent paragraph. The hot aqueous extract is cooled slowly and 0.9 g. of a white solid (Fraction X) is obtained initially which is separated by filtration. The filtrate is concentrated by evaporation of the solvent and there is obtained 0.3 g. of bis(trimethylammonium) dodecahydrododecaborate(2−), i.e., $[(CH_3)_3NH]_2B_{12}H_{12}$.

The identity of the compound is confirmed by its infrared absorption spectrum.

The solid product, previously referred to as Fraction X, is obtained in larger amount in repeat runs of the process. The fraction is separated into two homogeneous fractions and intermediate mixtures by fractional crystallization from water. The least soluble fraction is referred to as Fraction B and the most soluble fraction as Fraction C. These fractions are new compositions of matter containing boron and nitrogen. They are characterized chemically and by infrared absorption spectra in the following paragraphs. The infrared absorption spectra are obtained on Nujol mulls of the compositions and the characteristic bands are expressed as cm.$^{-1}$ units. The bands are exclusive of those common with Nujol.

*Fraction A.*—A portion of this fraction is crystallized from methylene chloride-petroleum ether solution to yield a white solid which is soluble in acetone and liquid sulfur dioxide. The product in acetone solution reduces the silver ion. Characteristic bands in the infrared absorption spectrum of the product are as follows: 2500, strong, sharp; 2150, very weak, sharp; 1490, medium, sharp; 1420, 1400, very weak, sharp; 1260, weak, sharp; 1140, weak, sharp; 1130, 1110, very weak, sharp; 1090, medium, sharp; 1050, medium, sharp; 995, medium, sharp; 985, medium, sharp; 885, medium, sharp; and 725, weak, broad.

The nuclear $B^{11}$ magnetic resonance spectrum of the product consists of a symmetrical doublet and the $J_{B-H}$ value is 120 c.p.s. The chemical composition of the product is $B_{15}H_{44}C_9N_3$ and it contains the anion $$B_{12}H_{11}N(CH_3)_3^-$$

*Analysis.*—Calc'd for $B_{15}H_{44}C_9N_3$: C, 30.30; H, 12.40; B, 45.60; N, 11.79. Found: C, 29.91; H, 12.23; B, 44:31; N, 11.46.

A mixture of 0.2223 g. of the fraction A product and 10 ml. of aqueous 30% potassium hydroxide is charged into a reaction vessel which is equipped with a reflux condenser. Volatile material is collected in a trap, cooled with liquid nitrogen, which is joined to the reflux condenser. The mixture, which is a slurry, is heated to refluxing temperature for 1–2 hours. White needles of unreacted trimethylamine-borane collect on the cool inner surface of the condenser and a small quantity of trimethylamine is collected in the trap. The slurry changes appearance and substantially all of the solid dissolves during the refluxing operation. The solution is filtered while hot and, on cooling, 150 mg. of white, rod-shaped crystals separate. The crystals are separated by filtration and they are dissolved in water. An aqueous solution of trimethylsulfonium iodide is added to the above solution and white crystals of trimethylsulfonium trimethylamineundecahydrododecaborate(1−) precipitate. The crystals are separated by filtration and they are recrystallized from water to give 100mg. of trimethylsulfonium trimethylamineundecahydrododecaborate(1−). The identity of the compound is confirmed by its infrared absorption spectrum and by elemental analysis. Characteristic absorption bands (expressed as cm.$^{-1}$) in the infrared spectrum of a Nujol mull of the compound are as follows: 2480, very strong, sharp; 1480, medium, sharp; 1320, weak, sharp; 1230, weak, broad; 1050, strong, sharp; 980, with shoulder; 990, medium, sharp; 885, medium, sharp; and 725, medium, broad.

*Analysis.*—Calc'd for $(CH_3)_3SB_{12}H_{11}N(CH_3)_3$: B, 46.84; S, 11.57; N, 5.05; C, 26.00; H, 10.54. Found: B, 45.19; S, 11.62; N, 5.00; C, 25.96; H, 10.32.

*Fraction B.*—Elemental analyses and the infrared absorption spectrum show that this white crystalline fraction is a compound of the formula $$[BH_2 \cdot 2N(CH_3)_3]B_{12}H_{11}N(CH_3)_3$$

The infrared absorption spectrum is as follows: 2450, strong, sharp; 1480, medium, sharp; 1400, medium, sharp, sharp; 1230, medium, sharp; 1190, medium, sharp; 1110, medium, sharp; 1100, weak, sharp; 1040, medium, sharp; 995, medium, sharp; 975, medium, sharp; 880, medium, sharp; 840, medium, sharp; 740, weak, sharp; 720, medium, broad.

*Analysis.*—Calc'd for $B_{13}C_9H_{40}N_3$: C, 32.65; H, 12.18; N, 12.69; B, 42.48. Found: C, 32.74; H, 12.13; N, 12.74; B, 42.46; C, 32.54; H, 12.48; N, 12.47.

*Fraction C.*—This fraction is a compound of the formula $[(CH_3)_3NH][B_{12}H_{11}N(CH_3)_3]$ wherein the cation-forming group and the anion-forming group are shown in brackets solely for the sake of clarity. The infrared absorption spectrum of this compound shows the following characteristic bands: 3100, medium, sharp; 2480, strong, sharp; 1500, weak, sharp; 1400, weak, sharp; 1230, medium, sharp; 1190, weak, sharp; 1120, weak, sharp; 1040, medium, sharp; 980, medium, sharp; 880, medium, sharp; 810, very weak, broad; 725, weak, broad.

An aqueous solution containing 1.1 g. of the above compound, i.e., $(CH_3)_3NHB_{12}H_{11}N(CH_3)_3$, is passed through a column filled with a strong acid ion-exchange resin (a cross-linked polystyrenesulfonic acid) to yield an aqueous solution of the acid, $HB_{12}H_{11}N(CH_3)_3$, or expressed in the hydronium form, $(H_3O)B_{12}H_{11}N(CH_3)_3$. Titration of the aqueous solution with 0.1 N NaOH solution forms the sodium salt, $NaB_{12}H_{11}N(CH_3)_3$, and the titration indicates an equivalent weight value for the trimethylammonium salt of 250 (calculated value, 260). The pKa value for the acid is about 2, i.e., it behaves as a strong acid. Evaporation of the aqueous solution of the acid under very low pressure (generally less than 1.0 mm. of mercury) yields the acid as a crystalline, hygroscopic white solid.

B. A presure vessel of corrosion-resistant steel (capacity, 400 ml.) is charged as described in Part A with 21 g. of trimethylamine-borane adduct and 12 g. of diborane. The reaction mixture is heated under autogenous pressure with agitation for 10 hours at 175° C. The reaction vessel is cooled and volatile products are removed by venting for 1 hour under reduced pressure. The white solid (28.1 g.) which remains in the reaction vessel is removed and it is boiled for about 5 minutes with 50 ml. of water. An insoluble portion is separated by filtration to obtain 9.0 g. of the compound $[H_2B \cdot 2N(CH_3)_3][B_{12}H_{11}N(CH_3)_3]$, previously described in Part A under the paragraph "Fraction B."

The filtrate from the above separation is cooled and a crystalline product precipitates which is separated by filtration to yield 9.0 g. of the compound $$[H_2B \cdot 2N(CH_3)_3]_2B_{12}H_{12}$$

The identity of the compound is confirmed by its infrared absorption spectrum and by comparison with a second sample of the compound whose elemental analysis is a s follows.

*Analysis.*—Calcd. for $[H_2B \cdot 2N(CH_3)_2]_2B_{12}H_{12}$: B, 37.5; C, 35.7; H, 12.95; N, 13.82. Found: B, 37.0; C, 35.7; H, 13.0; N, 13.8.

C. Using the procedure described in Part B, above, a mixture of 7.4 g. of trimethylamine-borane and 7.0 g. of diborane is heated for 10 hours at 125° C. with agitation. There is obtained 9.6 g. of a white chunky solid which is agitated with methylene dichloride. The mixture is filtered to separate 5.3 g. of a gray insoluble solid. The yellow filtrate is evaporated to yield 4–5 g. of a yellow solid designated as Fraction A.

Fraction A is again dissolved in methylene dichloride and the solution is filtered to remove a small quantity of insoluble material. The filtrate is diluted with petroleum ether and the yellow precipitate which forms is separated by filtration. The solid is extracted with hot water to yield a water-soluble component. Evaporation of the aqueous extract yields $[(CH_3)_3NH]_2B_{12}H_{12}$ which is identified by its infrared absorption spectrum. The substantially insoluble or, at best, very sparingly soluble product is $[H_2B \cdot 2N(CH_3)_3]_2B_{12}H_{12}$, which is characterized as described in Part B.

*Example II*

A pressure vessel of corrosion-resistant steel (125 ml. capacity) is charged with 3.23 g. of triethylamine-borane adduct $[(C_2H_5)_3N-BH_3]$, closed and evacuated to a low pressure (less than 1 mm. Hg). Sufficient diborane $(B_2H_6)$ is charged into the vessel to provide an absolute pressure of approximately 6 atmospheres (73 p.s.i. gauge pressure) at 50° C. The reaction mixture is maintained at this pressure and temperature for 1.5 hours and, at the end of this time, no increase in pressure is noted, i.e., no hydrogen is formed under these conditions. The temperature is increased to 75° C. and a pressure increase, resulting from reaction and formation of by-product hydrogen, is noted. The reaction mixture is maintained at 75° C. and an absolute pressure of about 6.2 atmospheres (78 p.s.i. gauge) for 3 hours and it is then heated to 100° C. for 2 hours. The vessel is cooled and unreacted diborane is removed by venting the vessel and passing the volatile products through a trap cooled to about −196° C. There remains in the reaction vessel 3.61 g. of a solid residue. The solid residue is crystallized twice from an ethanol-water mixture to obtain 0.325 g. of bis(triethylammonium) dodecahydrododecaborate(2−), i.e., $[(C_2H_5)_3NH]_2B_{12}H_{12}$. The identity of the product, which is a white solid, is confirmed by its infrared absorption spectrum.

*Example III*

A pressure vesesl (capacity, 100 ml.) is charged as described in Example I with 6.0 ml. of triethylamine-borane addition compound $[(C_2H_5)_3N—BH_3]$ and 2.78 g. of pentaborane $(B_5H_9)$. The mixture is heated with agitation at 125° C. for 10 hours. The vessel is cooled and volatile products are removed by venting and they are collected in a cold cylinder. There is obtained in the volatile products 0.104 mole of hydrogen and a small quantity of condensable material which is not characterized.

The non-volatile residue in the reaction vessel consists of 6.8 g. of a pale yellow solid. The product is washed with triethylamine and it is then crystallized from hot water to form 4.5 g. of pure bis(triethylammonium) dodecahydrododecaborate. The identity of the compound is confirmed by its infrared absorption spectrum and by elemental analysis. The yield of product is 80%.

*Analysis.*—Calcd. for $[(C_2H_5)_3NH]_2B_{12}H_{12}$: C, 41.61; H, 12.81; B, 37.73. Found: C, 41.93, 41.76; H, 12.71, 12.78; B, 37.49.

*Example IV*

A. A small glass vessel is employed which is fitted with a stirrer, a thermometer and a reflux condenser which is also connected to a wet test meter. The vessel is charged with 5 g. of triethylamine-borane addition compound $[(C_2H_5)_3N\text{---}BH_3]$ and 2 g. of decaborane $(B_{10}H_{14})$. A yellow solution forms without gas evolution. The solution is heated to 90–100° C. for one hour, and 600 ml. of gas are evolved as measured by the wet test meter. A yellow, somewhat gelatinous, solid forms which becomes partially crystalline during the heating period. The temperature is raised to 150° C. and a vigorous reaction occurs with a sharp temperature rise to about 210° C. Evolution of about 670 ml. of gas occurs in less than 2 minutes. The product in the flask is a white solid which is flecked with yellow. The solid is washed with diethyl ether and there remains 5.6 g. of a pale yellow damp solid. The solid is crystallized from hot water to yield 2.8 g. of white crystalline bis(triethylammonium) dodecahydrododecaborate. The identity of the compound is confirmed by its infrared absorption spectrum. The yield of product is almost 100%.

B. A glass vessel, equipped as described in Part A, is charged with 200 ml. of $(C_2H_5)_3N\text{---}BH_3$. Nitrogen gas is passed into the vessel and the liquid is heated to 170–175° C. A solution of 29 g. of $B_{10}H_{14}$ in 100 ml. of $(C_2H_5)_3N\text{---}BH_3$ is added to the vessel over a period of about one hour with vigorous stirring. After addition is complete, the reaction mixture is stirred 15 minutes, maintaining the temperature at 170–175° C. Hydrogen is evolved during the reaction and evolution of this gas decreases sharply during the final stirring. A total of 19.9 liters of gas is evolved.

The reaction mass is a mixture of a white solid and pale yellow liquid. It is cooled to prevailing air temperature (about 25° C.) and the solid is separated by filtration. The solid is washed with ether and dried. There is obtained 69 g. of bis(triethylammonium) dodecahydrododecaborate(2—); yield, 84% based on $B_{10}H_{14}$ employed. The identity of the compound is confirmed by its infrared absorption spectrum.

The ether washings are diluted with petroleum ether and a white solid (about 1 g.) precipitates. The solid is separated by filtration and it is recrystallized from ethanol to yield a white crystalline solid which is triethylammonium triethylamine-undecahydrododecaborate(1—), i.e., a compound of the formula $$[(C_2H_5)_3NH]^+[B_{12}H_{11}N(C_2H_5)_3]^-$$

where the anion and cation are shown in brackets. This species of a novel class of compounds is written more conventionally as $(C_2H_5)_3NHB_{12}H_{11}N(C_2H_5)_3$. The identity of the compound is confirmed by elemental analysis.

*Analysis.*—Calc'd for $(C_2H_5)_3NHB_{12}H_{11}N(C_2H_5)_3$: C, 41.86; H, 12.29; B, 37.71; N, 8.14. Found: C, 42.01, 41.50; H, 12.61, 12.17; B, 37.06; N, 8.25, 8.29.

The infrared absorption spectrum of triethylammonium triethylamine-undecahydrododecaborate(1—) in a Nujol mull is as follows, exclusive of the bands coincident with Nujol (expressed as cm.$^{-1}$): 3200, medium, sharp; 2500, strong, sharp; 1480, medium, sharp; 1400, weak, sharp; 1360–1380, weak, fine structure; 1180, very weak, sharp; 1160 weak, sharp; 1140, weak sharp; 1120, very weak, sharp; 1080, very weak, sharp; 1060, medium, sharp; 1040, medium, sharp; 1020, very weak, sharp; 1010, very weak, sharp; 985, weak, sharp with shoulder at 950; 890, weak, sharp; 850, weak, sharp; 835, medium, sharp; 800, weak, sharp; 770, very weak, sharp; and 745, weak, broad.

C. A pressure vessel is charged with 2.5 g. of $B_{10}H_{14}$ and 6 ml. of triethylamine-borane. The vessel is chilled, evacuated to a low pressure (less than 1 mm. of Hg) and sealed. The vessel and contents are heated with agitation at 150° C. for 12 hours. The vessel is cooled and volatile products are removed by venting. The remaining reaction mass is processed as described in Parts A and B to obtain the products described in Part A and Part B.

The process described in Example IV, Parts A, B and C, is operable with other boron hydrides. To illustrate, 20 ml. of triethylamine-borane adduct $[(C_2H_5)_3N\text{---}BH_3]$ is charged into a reaction vessel and it is heated under a blanket of an inert gas (argon) to a temperature of 175° C. A slow stream of diborane is passed into the vessel below the surface of the triethylamine-borane adduct. The reaction mass is heated gradually to 200° C. for a period of about 2 hours with continued passage of diborane. Vigorous refluxing occurs and hydrogen gas is released. The reaction mass is worked up as described in Example IV to obtain products of the type described in this example.

Examples I through IV illustrate the operation of the process employing as reactants a tertiary amine-borane addition compound and the boron hydrides, diborane, pentaborane and decaborane. This mode of operation is generic to tertiary amine-borane adducts. To illustrate, the boran hydrides can be reacted with tri-n-butylamine-borane, tridodecylamine-borane, trioctadecylamine-borane, tricyclohexylamine-borane, methyldicyclohexylamine-borane, and the like, to form the corresponding bis(tri-substituted ammonium) dodecahydrododecaborates(2—) and tri-substituted ammonium tertiary amine-undecahydrododecaborates(1—).

*Example V*

A. A corrosion-resistant pressure vessel (capacity, 100 ml.) is charged with 2.63 g. of triethylamine. The charged vessel is closed, cooled to about —78° C. with a carbon dioxide-acetone mixture and connected to a vacuum pump. Pressure in the chilled vessel is reduced to less than 1 mm. of mercury. The vessel is connected to a source of diborane and 2.2 g. of this reactant $(B_2H_6)$ is charged into the reaction chamber. The ratio, moles $B_2H_6$/moles $(C_2H_5)_3N$, is 3.1. The vessel is sealed and heated to 100° C. for 10 hours with agitation under autogenous pressure. The vessel is then cooled to about —78° C., and volatile reaction products are removed by venting into a trap cooled to about —196° C. with liquid nitrogen. There is obtained about 0.13 mole of a non-condensable gas which is hydrogen. The material condensed in the trap is separated into three fractions by passage through traps cools, respectively, to —78° C., —135° C., and —196° C. The product collected at —78° C. is $B_5H_9$ (0.0034 mole); in the trap at —135° C., less than 0.0001 mole of unidentified product is obtained; in the trap at —196° C., 0.0032 mole of unreacted $B_2H_6$ is collected.

A non-volatile yellowish solid which remains in the reaction vessel is removed by washing with triethylamine. The washings are filtered and the solid product is dried at 90° C. under very low pressure (about $0.1\mu$ of Hg). There is obtained 3.27 g. of bis(triethylammonium) dodecahydrododecaborate(2—) as a nearly white powder. The product is crystallized from an ethanol-water mixture to yield crystalline colorless prisms. Successive crops of crystals yield 2.51 g. of very pure product which has the composition $[(C_2H_5)_3NH]_2B_{12}H_{12}$. The identity of the compound is confirmed by its infrared absorption spectrum.

B. Using the procedure described in Part A, a mixture of 2.77 g. of triethylamine and 2.04 g. of diborane is heated at 100° C. for 2 hours with agitation. Volatile products of the reaction are separated and are found to contain 0.178 g. of hydrogen, 0.24 g. of pentaborane(9), i.e., $B_5H_9$, and 0.27 g. of unreacted diborane. The product remaining in the reaction vessel is 3.50 g. of a mixture of liquid and solid from which 1.61 g. of $$[(C_2H_5)_3NH]_2B_{12}H_{12}$$

a white solid, is separated by filtration. The identity of this product is confirmed by its infrared absorption spectrum. Yield: 38%, based on the diborane reactant.

C. A reaction vessel is charged, as described in Part A, with 2.75 g. of $(C_2H_5)_3N$ and sufficient diborane to provide a pressure of 6 p.s.i. gauge at 100° C. The mixture is maintained under these conditions for a short period, after which more diborane is charged into the vessel to provide a pressure of about 20 p.s.i. gauge, i.e., an absolute pressure of about 2.3 atmospheres, at 100° C. The release of hydrogen as a by-product results in a pressure rise of about 3 p.s.i. gauge over a period of 5 hours. After this period of time the vessel is cooled and excess diborane is removed by venting. There is obtained 3.25 g. of residue which is filtered to isolate 0.025 g. of solid material. The solid product is crystallized from ethanol-water mixtures to obtain $[(C_2H_5)_3NH]_2B_{12}H_{12}$.

*Example VI*

Using the process as described in Example V, Part A, a mixture of 1.7 g. of diborane and 7.2 g. of triethylamine is heated at 150° C. for 10 hours in a pressure vessel under autogenous pressure with agitation. The ratio, moles $B_2H_6$/moles $(C_2H_5)_3N$, is 0.9. Volatile products, consisting of 0.0805 mole of hydrogen, are removed by venting as described in Example II. The liquid and solid mixture in the reaction vessel is filtered to yield 1.9 g. of white crystalline bis(triethylammonium)dodecahydrododecaborate(2—). The product is crystallized from an ethanol-water mixture and its identiy is confirmed by its infrared absorption spectrum and by elemental analysis.

*Analysis.*—Calc'd for $[(C_2H_5)_3NH]_2B_{12}H_{12}$: C, 41.61; H, 12.81; N, 8.09; B, 37.49. Found: C, 41.48, 41.20; H, 12.87, 12.61; N, 8.03, 8.02; B, 37.30, 37.19.

*Example VII*

Using the procedure described in Example V, Part A, a mixture of 3.945 g. of triethylamine and 2.2 g. of diborane is heated at 175° C. for 12 hours with agitation under autogenous pressure. The ratio, moles $B_2H_6$/moles $(C_2H_5)_3N$, is 2.0. There is obtained as by-products 1.42 moles of hydrogen and 1.25 g. of $(C_2H_5)_3N-BH_3$. The principal product, isolated and purified as described in Example V, is 4.19 g. of bis(triethylammonium) dodecahydrododecaborate(2—). The identity of the compound is confirmed by its infrared absorption spectrum and by elemental analysis.

*Analysis.*—Cal'd for $[(C_2H_5)_3NH]_2B_{12}H_{12}$: C, 41.61; H, 12.81; B, 37.49; N, 8.09. Found: C, 39.87, 39.66; H, 12.12, 12.08; B, 37.44, 36.54; N, 8.15, 8.11.

The infrared spectrum (in a Nujol mull) shows bands at the following wavelengths, exclusive of those coincident with Nujol (expressed as cm.$^{-1}$ units): 3150, medium, sharp; 2480, strong, sharp; 1440, medium; multiplet centered around 1370, weak; 1270, very weak, sharp; 1155, medium, sharp; 1060, strong, sharp; 1015, strong, sharp; 842, medium, sharp; 792, weak; 742, very weak; 715, medium.

*Example VIII*

Using the procedure described in Example V, Part A, a pressure vessel (capacity, 100 ml.) is charged with 4.9 g. of freshly distilled tri(n-butyl)-amine and 2.11 g. of diborane. The vessel and contents are heated with agitation to 125° C. and the reaction is maintained at this temperature for 5 hours under autogenous pressure. The vessel is cooled and products which are volatile at prevailing atmospheric temperature (about 25° C.) are collected for analysis. There is obtained about 0.26 g. of hydrogen together with boron hydrides which consist principally of pentaborane(9) and diborane. The non-volatile product remaining in the reaction vessel is removed and washed with dry diethyl ether. The ether washings, on evaporation, yield 1 g. of a yellow oil which is not further characterized. The ether-insoluble product is a with crystalline solid, which is crystallized from water-ethanol to yield 4.0 g. of bis(tri-n-butylammonium) dodecahydrododecaborate (2—), i.e., $$[(C_4H_9)_3NH]_2B_{12}H_{12}$$

yield, 68%. The identity of the product is confirmed by elemental analysis and by its infrared absorption spectrum.

*Analysis.*—Calc'd for $C_{24}H_{68}N_2B_{12}$: C, 56.01; H, 13.32; B, 25.23; N, 5.44. Found: C, 56.12, 56.03; H, 13.12, 13.22; B, 24.95; N, 5.66, 5.66.

The infrared spectrum of the compound in a Nujol mull shows the following major absorption bands (expressed as cm.$^{-1}$ units): 3100, strong, sharp; 2500, strong, sharp; 1140, weak, sharp; 1095, weak, sharp; 1060, strong, sharp; 1030 shoulder, weak, sharp; 975, weak, sharp; 950, weak, sharp; 920, medium, sharp; 900, weak, sharp; 782, weak, sharp; 730, medium, sharp; 710–715 doublet, medium, broad; fine structure in the regions 1200–2100 and 700–900. These bands are exclusive of those coincident with bands due to Nujol.

*Example IX*

Using the procedure described in Example V, Part A, a mixture of 2.4 g. of N-methylmorpholine and 2.02 g. of diborane is heated for 5 hours at 125° C. under autogenous pressure. There is obtained about 0.21 g. of hydrogen in the volatile by-products and about 2 g. of a sticky yellow solid as the non-volatile product. The non-volatile product is crude bis(N-methylmorpholinium) didecahydrododecaborate(2—), which has the following structural formula:

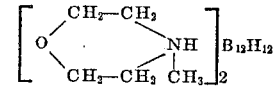

The product is boiled with acidified water (acidified with $H_2SO_4$) to remove any amine-borane adduct which might be present and the solution is filtered. A clear filtrate is obtained which is an aqueous solution of bis(N-methylmorpholinium) dodecahydrododecaborate(2—).

The above salt is converted to the triethylammonium salt by adding to the solution an aqueous solution of triethylammonium chloride. A white precipitate forms which is separated by filtration to yield 0.9 g. of $$[(C_2H_5)_3NH]_2B_{12}H_{12}$$

Isolation of the above salt shows that the yield of bis-(N - methylmorpholinium) dodecahydrododecaborate-(2—) obtained in the reaction is 22%.

*Example X*

Using the procedure described in Example V, Part A, a mixture of 2.6 g. of N-methylpiperidine and 2.09 g. of diborane is heated for 5 hours at 125° C. under autogenous pressure. Volatile products are isolated and are found to contain about 0.248 g. of hydrogen and undetermined quantities of unreacted diborane and pentaborane(9). The non-volatile products consist of about 3 g. of a tacky white solid which is impure bis(N-methylpiperidinium) dodecahydrododecaborate(2—), i.e., a compound of the following structure:

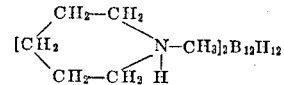

The white solid is boiled with dilute sulfuric acid to remove any borane-amine complex. The solution is filtered and a clear aqueous solution of bis(N-methylpiperidinium) dodecahydrododecaborate(2−) is obtained.

An aqueous solution of triethylammonium chloride is added with stirring to the hot aqueous filtrate obtained as described in the preceding paragraph. The reaction mixture is cooled and the white solid which forms is separated by filtration. There is obtained 1.99 g. of bis(triethylammonium) dodecahydrododecaborate(2−).

The yield of bis(N-methylpiperidinium) dodecahydrododecaborate(2−) obtained in the reaction is therefore 43%.

*Example XI*

A. A mixture of 20.4 g. of ethyldimethylamine and 16 g. of diborane is heated in a pressure vessel under autogenous pressure for 10 hours at 175° C. The vessel is cooled and vented under reduced pressure to release volatile products. A gummy solid residue (wt., 27 g.) is removed from the vessel and boiled with aqueous ethanol containing a small quantity of hydrochloric acid. The hot solution is filtered to remove a small amount of insoluble maaterial. The filtrate is cooled and crystals form which are separated to obtain 3.9 g. of $$[H_2B \cdot 2N(CH_3)_2C_2H_5]B_{12}H_{11} \cdot N(CH_3)_2C_2H_5$$

*Analysis.*—Calc'd for the above $B_{12}H_{11} \cdot N(CH_3)_2C_2H_5$ salt: C, 38.62; H, 12.42; N, 11.26; B, 37.69. Found: C, 39.12, 39.20; H, 12.28, 12.57; N, 11.13, 11.19; B, 37.60, 37.80.

The infrared spectrum of the compound shows absorption bands at the following wavelengths (expressed as cm.$^{-1}$): 2450, strong, sharp; 1400, weak, sharp; 1200, 1170, medium, sharp, shoulders; 1110, 1090, weak, sharp; 1040, 1020, medium, sharp; 990 (shoulder), 980, medium, sharp; 925, weak, broad; 860, medium, sharp; 790, medium, sharp; and 720, medium, broad.

B. The mother liquor is concentrated and cooled further to obtain 2.7 g. of $$[H_2B \cdot 2N(CH_3)_2C_2H_5]_2B_{12}H_{12}$$

Further concentration and cooling yields an additional 3.2 g. of the dodecahydrododecaborate(2−) salt.

*Analysis.*—Calc'd for the above $B_{12}H_{12}^=$ salt: C, 41.76; H, 13.14; N, 12.18; B, 32.92. Found: C, 41.46, 41.23; H, 12.94, 12.77; N, 12.28, 12.13; B, 32.8.

The infrared spectrum of the compound shows absorption bands at the following wavelengths (expressed as cm.$^{-1}$): 2450 (shoulder), 2350, strong, sharp; 2000, weak, sharp; about 1480, broad; 1400, weak, sharp; 1380, weak, sharp; 1310–1305, weak, sharp; 1240, medium, sharp; 1210, strong, sharp; 1180, strong, sharp; 1105, medium, sharp; 1090, weak, sharp; 1055, strong, sharp; 1030, strong, sharp; 975, medium, sharp; 925–905, weak, sharp; 860, strong, sharp; 825, strong, sharp; 810, strong, sharp; and 715, strong, broad.

C. An aqueous solution of $$[H_2B \cdot 2N(CH_3)_2C_2H_5]B_{12}H_{11} \cdot N(CH_3)_2C_2H_5$$

is passed through a column filled with a commercial acid ion-exchange resin of the polyarylsulfonic acid type. The cation $[H_2B \cdot 2N(CH_3)_2C_2H_5]^+$, is retained by the resin in the column. The aqueous effluent, which contains the anion $[B_{12}H_{11} \cdot N(CH_3)_2C_2H_5]^-$, is set aside for other work.

The column containing the acid ion-exchange resin is now washed with dilute aqueous hydrochloric acid solution. The aqueous effluent obtained in this step contains $[H_2B \cdot 2N(CH_3)_2C_2H_5]Cl$ and it is evaporated to a small volume. An aqueous solution of $NH_4PF_6$ is added with stirring to precipitate $[H_2B \cdot 2N(CH_3)_2C_2H_5]PF_6$, a white solid which is separated, washed and dried to obtain about 0.05 g. of product.

*Analysis.*—Calc'd for $[H_2B \cdot 2N(CH_3)_2C_2H_5]PF_6$: C, 31.60; H, 7.96; P, 10.19; F, 37.49. Found: C, 31.96, 31.98; H, 8.13, 8.24; P, 9.62; F, 35.71.

The infrared spectra of the above compound shows absorption at the following wavelengths (expressed as cm.$^{-1}$): 2500, medium, sharp; 2380, weak, sharp; 1410, weak, sharp; 1390, weak, sharp; 1320, weak, sharp; 1240, medium, sharp; 1220, strong, sharp; 1190–1170 (doublet), medium, sharp; 1140, 1120, 1110, 1090, 1070, weak, sharp; 1030, medium, sharp; 1000, medium, sharp; 840, very sharp, broad.

The nuclear magnetic resonance spectrum is determined on $[H_2B \cdot 2N(CH_3)_2C_2H_5]PF_6$ in acetonitrile solution. The spectrum is calibrated at 14.2 megacycles relative to the boron resonance of $B(OCH_3)_3$, using side band technique [see, for example, J. T. Arnold and M. E. Packard, J. Chem. Phys. 19, 1608 (1951)]. These data determined for the $B^{11}$ isotope in the above compound are as follows: $J_{B-H}$, 105 c.p.s. (a symmetrical triplet, 1:2:1); shift from $B(OCH_3)_3$, +17.2 p.p.m.

*Example XII*

A. A mixture of 25 g. of diethylmethylamine and 16 g. of diborane is heated in a pressure vessel (400 ml. capacity) under autogenous pressure at 175° C. for 10 hours. The vessel is cooled and vented under reduced pressure to remove volatile products. A white semi-solid mass (wt., 34.4 g.) remains which is washed from the vessel with diethyl ether. The ether is removed by evaporation and the solid residue is boiled with acidified water. A gas forms and is released during this step in the process. The solution is now made strongly basic and boiled again to remove excess amine. An insoluble product remains which is separated by filtration to obtain 3.3 g. of $$[H_2B \cdot 2NCH_3(C_2H_5)_2]B_{12}H_{11} \cdot NCH_3(C_2H_5)_2$$

The product is a white solid which is purified by crystalllization.

*Analysis.*—calc'd for above salt: C, 43.38; H, 12.62; B, 33.87; N, 10.12. Found: C, 44.1; H. 13.1; B, 33.85; N, 10.12.

B. A mixture of 24.5 g. of diethylmethylamine and 16 g. of diborane is heated under autogenous pressure at 175° C. for 25 hours. The reaction mixture is processed as described in Part A to obtain 2.3 g. of $$[H_2B \cdot 2NCH_3(C_2H_5)_2]B_{12}H_{11} \cdot NCH_3(C_2H_5)_2$$

The infrared spectrum of the compound of Parts A and B show absorption at the following wavelengths (expressed as cm.$^{-1}$): 2500, shoulder at 2350, strong, sharp; 1450 (over Nujol band); 1410, weak, sharp; 1380, weak, sharp; 1330, 1300, weak, sharp; 1220, 1180, 1160, medium, sharp; 1110, weak, broad; 1090, 1070, weak, sharp; 1040, strong, sharp; 1030, 1010, medium, sharp; 970, medium, sharp; 910, weak, broad; 870, medium, broad; 850, weak, broad; 820, medium, broad; 790, medium, broad; 770, 750, weak, broad; and 720, medium, broad.

C. A small portion (0.2 g.) of $$[H_2B \cdot 2NCH_3(C_2H_5)_2]B_{12}H_{11} \cdot NCH_3(C_2H_5)_2$$

obtained as described in Part A is dissolved in water. The aqueous solution is passed through a column filled with a commercial acid ion-exchange resin of the polyarylsulfonic acid type. After passage is complete, the aqueous effluent is set aside and the column is washed with aqueous hydrochloric acid solution. The aqueous effluent, which now contains $[H_2B \cdot 2NCH_3(C_2H_5)_2]Cl$, is concentrated to a small volume and an aqueous solution of $NH_4PF_6$ is added with stirring. The solid which forms is separated to obtain 0.04 g. of $$[H_2B \cdot 2NCH_3(C_2H_5)_2]PF_6$$

as a white solid which melts at 137–142° C. Its identity is confirmed by elemental analysis.

*Analysis.*—Calc'd for above salt: C, 36.16; H, 8.50; N, 8.44; P, 9.33. Found (average): C, 36.9; H, 8.53; N, 8.31; P, 9.21.

The infrared spectrum of the compound shows bands at the following wavelengths (expressed as cm.$^{-1}$): 2500, medium, sharp; 2400, weak, sharp; 1220, medium, sharp; 1180, medium, broad; 1030, medium, broad; 830, strong, very broad; 770, medium, broad.

*Example XIII*

A mixture of 27 g. of N-methylpiperidine and 17 g. of diborane is heated in a pressure vessel (400 ml. capacity) at 175° C. for 10 hours. The reaction mixture, processed as described in Example XII, yields 26.4 g. of white residue from which there is obtained 6.7 g. of bis(N-methylpiperidine)-dihydroboron(1+) N-methylpiperidine - undecahydrododecaborate(1−). The compound is recrystallized from water.

*Analysis.*—Calc'd for

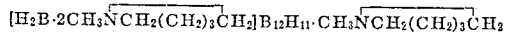

C, 47.90; H, 11.62; N, 9.31; B, 31.17. Found: C, 47.73, 47.71; H, 11.68, 11.62; N, 8.67, 8.81; B, 31.01.

The infrared spectrum of the compound shows bands at the following wavelengths (expressed as cm.$^{-1}$): 2500, strong, sharp; 2350, very weak, sharp; 1320, medium, sharp; 1290, weak, sharp; 1260, weak, sharp; 1240, medium, sharp; 1200, medium, sharp; 1170, medium, sharp; 1160, weak, sharp; 1080, weak, sharp; 1040, strong, sharp; 1020, medium, sharp; 990, medium, broad; 975, medium, broad; 950, medium, sharp; 870, strong, broad; 845, medium, sharp; 820, medium, sharp; 780, medium, sharp; and 720, medium, broad.

*Example XIV*

By the method of Example V, except that a 400-ml. pressure vessel was used, 37 g. of cyclohexyldimethylamine and 16 g. of diborane were heated at 175° C. for 10 hours. The nonvolatile product was 47 g. of a gray semisolid. The product was treated with boiling dilute hydrochloric acid, in which it all dissolved except for a small amount (less than 1 g.) of an oil, which was separated by decantation. On cooling, 3.0 g. of crystalline [cyclo-$C_6H_{11}NH(CH_3)_2]_2B_{12}H_{12}$ separated and was isolated by filtration. The product was identified by comparison of its infrared absorption spectrum with that of an authentic sample.

The insoluble oil that had been decanted was boiled with aqueous sodium hydroxide, and the mixture was cooled and extracted with ether. Addition of aqueous trimethylsulfonium iodide to the water solution resulted in precipitation of 1.8 g. of solid, which was a mixture containing about one part of $[(CH_3)_3S]_2B_{12}H_{12}$ and about three parts of $(CH_3)_3SB_{12}H_{11}N(CH_3)_2$cyclo-$C_6H_{11}$.

*Analysis.*—Calc'd for the 1:3 mixture: C, 35.2; H, 10.6; B, 39.0; N, 3.2; S, 12.0. Found: C, 35.4; H, 11.1; B, 37.9; N, 2.9; S, 11.9.

*Example XV*

By the method of the preceding example, 19 g. of N,N,N',N'-tetramethylethylenediamine and 16 g. of diborane were heated at 175° C. for 10 hours. The nonvolatile product was 35 g. of a brown solid that contained $[BH_2 \cdot (CH_3)_2NCH_2CH_2N(CH_3)_2]_2B_{12}H_{12}$.

The presence of the $B_{12}H_{12}^=$ anion was shown as follows: The crude solid was extracted with boiling water. On cooling, the aqueous extract deposited a colorless solid. Extraction of this material with 20% aqueous sodium hydroxide at room temperature, followed by addition of aqueous trimethylsulfonium hydroxide to the extract, brought about precipitation of $[(CH_3)_3S]_2B_{12}H_{12}$, which was identified by comparison with an authentic sample.

The presence of the cation was shown as follows: The solid that remained undissolved in 20% aqueous sodium hydroxide was extracted with benzene. The solid remaining undissolved in the benzene was treated with a boiling aqueous suspension of a strong basic anion-exchange resin, and the mixture was filtered. Addition of aqueous ammonium hexafluorophosphate to the filtrate, followed by concentration and chilling, gave crystals of $[BH_2 \cdot (CH_3)_2NCH_2CH_2N(CH_3)_2]PF_6$. This compound was identified by comparison with an authentic sample (cf. Example XXI, Part C).

The process illustrated in Examples V–XV can be used to react diborane with a wide range of tertiary amines. To illustrate, trimethylamine yields bis(trimethylammonium) dodecahydrododecaborate, tri(2-ethylhexyl)amine yields bis[tri(2-ethylhexyl)-ammonium] dodecahydrododecaborate, tridodecylamine yields bis(tridodecylammonium) dodecahydrododecaborate, trioctadecylamine yields bis(trioctadecylammonium) dodecahydrododecaborate, dimethyl(β-phenylethyl)amine yields bis[dimethyl(β-phenylethyl)ammonium] dodecahydrododecaborate, tricyclohexylamine yields bis(tricyclohexylammonium) dodecahydrododecaborate, dimethylcyclohexylamine yields bis(dimethylcyclohexylammonium) dodecahydrododecaborate, N,N'-dibutylpiperazine yields (N,N'-dibutylpiperazinium) dodecahydrododecaborate, N-ethylpiperidine yields bis(N-ethylpiperidinum) dodecahydrododecaborate and N-ethylmorpholine yields bis(N-ethylmorpholinium) dodecahydrododecaborate. In the above illustrations, it is understood that the dodecahydrododecaborate anion is divalent and that the named amines are reacted with diborane.

In each of the examples, the reaction of the boron hydride with a tertiary amine or a tertiary aminborane addition compound is conducted at a temperature of at least 75° C. No measurable release of hydrogen occurs and no formation of dodecahydrododecaborates occurs at lower temperatures as shown in Example II and as further illustrated in Example A, which follows:

*Example A*

A cylinder of corrosion-resistant steel (125 ml. capacity) is evacuated to a low pressure and it is charged with 2.84 g. of triethylamine. Sufficient diborane is charged into the cylinder to provide an absolute pressure of 3 atmospheres (30 p.s.i. gauge) at about 25° C. No release of hydrogen is observed under these conditions. Pressure in the vessel is then increased stepwise by intermittent injection of diborane until an absolute pressure of 6 atmospheres (75 p.s.i. gauge) is obtained. Again, no release of hydrogen is observed under these conditions (6 atmospheres and 25° C.). At this point the vessel is vented and free diborane is removed. There remains in the reaction vessel 3.23 g. of product, i.e., an increase of 0.39 g. over the original charge of triethylamine, which corresponds to a composition whose ratio of moles $(C_2H_5)_3N$/moles $B_2H_6$ is 2. The only product of the reaction at 25° C. and 6 atmospheres is, therefore, the addition compound $(C_2H_5)_3N—½B_2H_6$ or $(C_2H_5)_3N—BH_3$.

The tertiary ammonium salts of the novel anion can be passed in aqueous or alcoholic solution through an acid ion exchange resin to yield a solution of a free acid of the following formula $$HB_{12}H_{11}NRR^IR^{II}$$

where R, $R^I$, and $R^{II}$ have the meanings given previously. The process is illustrated in Example XVI and in Example IA.

*Example XVI*

A solution of  $(C_2H_5)_3NHB_{12}H_{11}N(C_2H_5)_3$ in ethanol is passed through a column packed with a polysulfonic acid ion-exchange resin, "Amberlite" IR–120(H), and the effluent which is collected is clear and highly acidic. It contains the acid $HB_{12}H_{11}N(C_2H_5)_3$.

The acid is comparable in strength to common mineral acids and it is most conveniently used in solution.

A broad range of salts which fall within the scope of the compounds are obtained by neutralizing aqueous or alcoholic solutions of the acids obtained above. This method of obtaining salts is exemplified in Example XVII, and, again in Example IA.

Example XVII

A portion of the acid effluent of Example XVI is titrated with an aqueous solution of CsOH to a pH of about 7. There is obtained as a white crystalline product cesium triethylamine-undecahydrododecaborate(1−), i.e., $$CsB_{12}H_{11}N(C_2H_5)_3$$

The identity of the compound is confirmed by elemental analysis.

*Analysis.*—Calc'd for $CsB_{12}H_{11}N(C_2H_5)_3$: Cs, 35.44; B, 34.62; C, 19.21; H, 6.90; N, 3.74. Found: Cs, 33.8; B, 34.04; C, 19.78, 19.78; H, 6.93, 7.21; N, 3.79, 3.81.

The infrared absorption spectrum of the cesium compound in a Nujol mull is as follows, expressed as cm.$^{-1}$ units and exclusive of the bands coincident with Nujol: 2500, strong, sharp; 1460–1380, fine structure; 1160 (doublet), very weak, sharp; 1130, weak sharp; 1080, weak, sharp; 1050, medium, sharp; 1020, weak, sharp; 1000, weak, sharp; 975, medium, sharp; 875, weak, sharp; 825, medium, broad; 785, very weak, broad; 765, very weak, broad; 735, medium, broad; and 720, medium, broad.

The acids, such as that prepared in Example XVI can be neutralized with alkali metal hydroxides (LiOH, NaOH, KOH), alkaline earth metal hydroxides [$Ba(OH)_2$, $Ca(OH)_2$], ammonia, ammonium hydroxide, metal-amine hydroxides, hydrazine, substituted hydrazines (phenylhydrazine, N,N-dimethylhydrazine), sulfonium hydroxides [$(CH_3)_3SOH$, $(C_4H_9)_3SOH$], phosphonium hydroxides [$(C_4H_9)_4POH$], tetraalkyl and mixed tetraaryl and alkyl-substituted ammonium hydroxides [$(CH_3)_4NOH$, $(C_6H_5CH_2)(CH_3)_3NOH$]. The compounds given in brackets are illustrative of the class of bases named.

The acid in aqueous or alcoholic solution can be agitated with inorganic oxides, hydroxides or carbonates to form metal or metal oxy salts of the $(B_{12}H_{11}NRR'R'')^{-1}$ anion. To illustrate, the solution of the acid can be reacted with $Na_2CO_3$, $CaCO_3$, $SrCO_3$, $Zn(OH)_2$, $V(OH)_3$, $Cr(OH)_3$, $Mn(CO_3)_2$, $FeCO_3$, $NiCO_3$, $Cu(OH)_2$, $ZnCO_3$, $Al(OH)_3$, $Sn(OH)_4$, $PbCO_3$, $(SbO)_2CO_3$, $(BiO)_2CO_3$, and the like to obtain the corresponding metal salts.

Example XVIII

A reaction vessel equipped with a stirrer and reflux condenser is charged with 0.8 of $$(C_2H_5)H_3NHB_{12}H_{11}N(C_2H_5)_3$$

and 50 ml. of methanol. The mixture is stirred and water is added gradually until the point of incipient precipitation is reached. The mixture is then heated to 50° C. and liquid bromine is added dropwise and with stirring. About 1.4 g. of bromine is absorbed and at this point the solution contains the compound $$[(C_2H_5)_3NH][B_{12}H_7Br_4N(C_2H_5)_3]$$

The solution is now heated to refluxing and about 6 g. of liquid bromine is added dropwise. The mixture is maintained at reflux (about 70° C.) for one hour. It is then cooled to about 25° C. and it is partially evaporated by use of a water-aspirator pump. White crystals form which are separated by filtration to yield 1.74 g. of $[(C_2H_5)_3NH][B_{12}H_5Br_6N(C_2H_5)_3]$. The compound is recrystallized from hot 90% methanol and its identity is confirmed by elemental analysis.

*Analysis.*—Calc'd for $B_{12}Br_6C_{12}N_2H_{36}$: B, 15.87; Br, 58.66; C, 17.62; H, 4.43. Found: B, 15.28; Br, 59.47; C, 17.58; H, 4.58.

Example XIX

The procedure of Example XVIII is repeated employing 0.8 g. $(C_2H_5)_3NHB_{12}H_{11}(C_2H_5)_3$ and 50 ml. of methanol but using chlorine in place of bromine. The initial reaction mixture is heated to reflux temperature and chlorine gas is bubbled through the mixture for about 1–1.5 hours. The reaction mixture is processed as described in Example XVIII to obtain 1.0 g. of $[(C_2H_5)_3NH][B_{12}H_4Cl_7N(C_2H_5)_3]$, a white crystalline solid whose identity is confirmed by elemental analysis.

*Analysis.*—Calc'd for $B_{12}Cl_7C_{12}N_2H_{35}$: B, 22.3; Cl, 42.4; C, 24.7; H, 6.05. Found: B, 21.64; Cl, 41.0; C, 25.0; H, 6.27.

The process of Example XVIII can be used to prepare iodine-bearing compounds, employing an iodine chloride as the halogenating agent, e.g., $$[(C_2H_5)_3NH][B_{12}I_{11}N(C_2H_5)_3]$$

can be obtained from $(C_2H_5)_3NHB_{12}H_{11}N(C_2H_5)_3$ and ICl.

Examples XVIII and XIX illustrate the reaction of the novel anion-containing compounds with halogen reagents to obtain substitution products of the following general formula:

$$M(B_{12}H_{11-y}X_y \cdot NRR^IR^{II})_n$$

where the symbols have the meanings previously described.

The compounds are soluble in oxygenated liquids, e.g., methanol and ethanol. Solubility in water ranges from the high solubility of the acids to rather low solubility for the amine salts and heavy metal salts.

Example XX

The compound $[H_2B \cdot 2N(CH_3)_3][B_{12}H_{11} \cdot N(CH_3)_3]$, obtained as described in Example I, is dissolved in water and the solution is passed through a column packed with a chloride-ion exchange resin ("Amberlite" IRA–400, chloride form). The effluent is evaporated to obtain bis(trimethylamine)dihydroboron(1+) chloride, i.e., $$[H_2B \cdot 2N(CH_3)_3]Cl$$

The compound is most conveniently obtained as a hydrate. The identity of the compound is confirmed by its nuclear magnetic resonance spectrum. In aqueous solution, the nuclear $B^{11}$ magnetic resonance spectrum of the compound consists of a symmetrical 1:2:1 triplet, $\delta = 14.8$ p.p.m., from $B(OCH_3)_3$, and the $J_{B-H}$ value is 119 c.p.s.

The compound is a white crystalline solid which is most conveniently isolated from aqueous solution with water of hydration, i.e., as $[H_2B \cdot 2N(CH_3)_3]Cl \cdot xH_2O$, where the value of $x$ is determined by the degree to which the compound is dried. Prolonged drying at very low pressures yields a substantially anhydrous product. The value of $x$ can, therefore, be zero and generally does not exceed 8. The hydrate free product is represented by the formula $[H_2B \cdot 2N(CH_3)_3]Cl$.

As stated earlier, the cations may be prepared by employing as one reactant a salt having the cation $$[BH_2 \cdot 2S(CH_3)_2]^+$$

The preparation of a representative salt of this cation is described in Example B.

Example B

A 3-necked glass reaction vessel (capacity 1000 ml.) is equipped with a reflux condenser. The vessel is cooled to about −78° C. with solid carbon dioxide and it is charged with 120 ml. of $(CH_3)_2S$. Pressure in the vessel is reduced to a low value and 25 g. of $B_2H_6$ is introduced into the vessel and absorbed by the $(CH_3)_2S$ to form the adduct $BH_3 \cdot S(CH_3)_2$. After warming this adduct to room temperature, 42 g. of $B_{10}H_{14}$ is added and the solution is heated to refluxing temperature and stirred for 2–4 hours. About 28 liters of gas is released during this step. The reaction mixture is cooled to 50–60° C. and the pressure in the vessel is reduced to a low value to remove all volatile material. The residue contains $$[BH_2 \cdot 2S(CH_3)_2]B_{12}H_{11} \cdot S(CH_3)_2$$

and it can be employed directly as a reactant in subsequent operations.

Example XXI

A. A solution is prepared consisting of about 20 ml. of dichloromethane and 2.1 g. of the solid obtained in Example B which contains $$[H_2B \cdot 2S(CH_3)_2]B_{12}H_{11} \cdot S(CH_3)_2$$

The solution is stirred and 5 ml. of $$(CH_3)_2NCH_2CH_2N(CH_3)_2$$

is added to it. The solution is evaporated to dryness, a further quantity of dichloromethane is added with stirring, and the mixture is again evaporated to dryness. Water is added to the residue and the mixture is boiled to remove residual dichloromethane. The hot solution is filtered to separate insoluble material and the filtrate is cooled. A white crystalline solid forms which is separated. The compound is recrystallized from water to obtain 0.40 g. of $$[H_2B \cdot (CH_3)_2NCH_2CH_2N(CH_3)_2]B_{12}H_{11} \cdot S(CH_3)_2$$

The above process is repeated employing 28 g. of crude $[H_2B \cdot 2S(CH_3)_2]B_{12}H_{11} \cdot S(CH_3)_2$, 50 ml. of dichloromethane and 10 ml. of $(CH_3)_2NCH_2CH_2N(CH_3)_2$. There is obtained 10 g. of the white crystalline product, described above. The identity of the compound is further confirmed by elemental analysis and by infrared spectroscopy.

*Analysis.*—Calc'd for $$[H_2B \cdot (CH_3)_2NC_2H_4N(CH_3)_2]B_{12}H_{11} \cdot S(CH_3)_2$$

C, 28.93; H, 10.60; N, 8.44; B, 42.35; S, 9.65. Found: C, 29.3; H, 10.5; N, 9.24, 8.57; B, 42.1; S, 9.86.

B. A small quantity (0.8 g.) of the product of Part A is dissolved in water and the solution is passed through a column filled with a commercial chloride-ion exchange resin ("Amberlite" IRA–400). The aqueous effluent is evaporated to dryness to obtain $$[H_2B \cdot (CH_3)_2NC_2H_4N(CH_3)_2]Cl$$

as a white hygroscopic solid. The infrared spectrum of the compound shows bands at the following wavelengths (expressed as cm.$^{-1}$): 2500, strong, sharp; 2450, medium, sharp; 1420, weak, sharp; 1290, medium, sharp; 1265, very weak, sharp; 1260, medium, sharp; 1240, weak, sharp; 1210, medium, sharp; 1160, strong, sharp; 1140, strong, sharp; 1130, strong, sharp; 1035, strong, sharp; 995, weak, sharp; 970, strong, sharp; 930, weak, broad; 865, strong, sharp; 795, strong, sharp; 725, weak, broad; and 700, weak, broad.

The nuclear magnetic resonance of the above chloride salt, measured in aqueous solution, yields the following data: $J_{B-H}$, 111 c.p.s. (a symmetrical triplet 1:2:1); shift from $B(OCH_3)_3$, +12.0 p.p.m.

C. The chloride salt obtained as described in Part B is dissolved in water and an aqueous solution of $NH_4PF_6$ is added with stirring. The solid which forms is separated and recrystallized to obtain 0.5 g. of $$[H_2B \cdot (CH_3)_2NC_2H_4N(CH_3)_2]PF_6$$

The identity of the compound is confirmed by elemental analysis.

*Analysis.*—Calc'd for above PF$_6$ salt: C, 26.30; H, 6.61; N, 10.22; B, 3.95; P, 11.30; F, 41.60. Found: C, 26.84; H, 6.65; N, 10.08; B, 4.35; P, 10.92, 11.04; F, 41.84.

Example XXII

A. A mixture of 38 ml. of $(CH_3)_2S$, 9 g. of $B_2H_6$ and 7.1 g. of $B_{10}H_{14}$ is reacted as described in Example B to obtain a product containing $$[H_2B \cdot 2S(CH_3)_2]B_{12}H_{11} \cdot S(CH_3)_2$$

The product so obtained is dissolved in about 75 ml. of dichloromethane and 10 ml. of $$(CH_3)_2NCH(CH_3)CH_2CH_2N(CH_3)_2$$

is added with stirring. The temperature of the mixture, which is 19° C., rises to 32° C. during this step. The mixture is stirred one hour and it is processed as described in Example XXI. There is obtained 3.1 g. of white crystalline solid which is 1,N,N,N',N'-pentamethyltrimethylenediaminedihydroboron(1+) dimethyl sulfide undecahydrododecaborate(1−). The product is purified by recrystallization from water. Its identity is confirmed by elemental analysis and its infrared absorption spectrum.

*Analysis.*—Calc'd for $$[H_2B \cdot (CH_3)_2NCH(CH_3)CH_2CH_2N(CH_3)_2]B_{12}H_{11} \cdot S(CH_3)_2$$

C, 33.35; H, 10.92; N, 7.78; B, 39.06; S, 8.96. Found: C, 33.36, 33.06; H, 10.55, 10.70; N, 7.17, 7.58; B, 39.67; S, 9.07.

The infrared spectrum of the compound shows bands at the following wavelengths (expressed as cm.$^{-1}$): 2400, strong, sharp; 2380 (shoulder); 1480, 1420, 1410, very weak, sharp; 1320, 1290, 1260 very weak, sharp; 1225, medium, sharp; 1190, strong, sharp; 1150, medium, sharp; 1115, 1095, weak, sharp; 1040, strong, broad; 1000, medium, sharp; 965, strong with shoulders; 945, weak, sharp; 910, medium, sharp; 870, medium, sharp; 825, strong, sharp; 795, weak, sharp; and 720, medium, broad.

B. A portion (1.5 g.) of the compound of Part A is dissolved in water and the solution is passed through a column filled with a commercial chloride-ion exchange resin. The aqueous effluent is evaporated to obtain a concentrated solution of $$[H_2B \cdot (CH_3)_2NCH(CH_3)CH_2CH_2N(CH_3)_2]Cl$$

C. A portion of the solution obtained in Part B is mixed with an aqueous solution of $NH_4PF_6$. An oily insoluble product forms which is separated by a decantation. The oily product is a compound of the formula $$[H_2B \cdot (CH_3)_2NCH(CH_3)CH_2CH_2N(CH_3)_2]PF_6$$

D. A portion of the solution obtained in Part B is mixed with an aqueous solution of chloroauric acid. A yellow solid forms which is separated, washed and dried to obtain the chloroaurate salt of the novel cation.

*Analysis.*—Calc'd for $$[H_2B \cdot (CH_3)_2NCH(CH_3)CH_2CH_2N(CH_3)_2]AuCl_4$$

C, 19.37; H, 4.47; N, 5.65; B, 2.18; Cl, 28.59. Found: C, 18.95; H, 4.76; N, 5.82; 5.93; B, 2,29; Cl, 27.82; 27.91.

E. A portion of the solution obtained in Part B is mixed with an aqueous solution of $H_2HgCl_4$ (obtained from HCl and $HgCl_2$). A precipitate forms which is separated, washed and dried to obtain $$[H_2B \cdot (CH_3)_2NCH(CH_3)CH_2CH_2N(CH_3)_2]_2HgCl_4$$

as a white crystalline compound.

F. A portion of the solution obtained in Part B is mixed with a small quantity of monosodium 1,1,3,3-tetracyanopropenide. The product separates as pale yellow needles which become discolored in the presence of daylight. The needles are removed by filtration and they are recrystallized to obtain 1,N,N,N',N'-pentamethyl-trimethylenediamine - dihydroboron(1+)1,1,3,3 - tetracyanopropenide(1−). The identity of the compound is confirmed by elemental analysis and by its infrared spectrum.

*Analysis.*—Calc'd for $$[H_2B \cdot (CH_3)_2NCH(CH_3)CH_2CH_2N(CH_3)_2](NC)_2CCHC(CN)_2$$

C, 60.41; H, 7.77; N, 28.18; B, 3.63. Found: C, 60.85; H, 8.45; N, 28.45; 27.97; B, 3.82.

The infrared spectrum of the compound shows bands at the following wavelengths (expressed as cm.$^{-1}$): 2450, medium, sharp; 2350, weak, sharp; 2190, strong, sharp; 1550, strong, sharp; 1400, weak, sharp; 1370, medium, sharp; 1330, strong, sharp; 1280, 1260, weak, sharp; 1230, medium, sharp; 1190, strong, sharp; 1150, medium, sharp; 1110, weak, sharp; 1100, weak, sharp; 1050, medium, sharp; 1000, medium, sharp; 985, 965, 950, 920, weak, sharp; 910, 870, medium sharp; 830, medium, broad; 810, weak, broad; 800, weak, sharp; 770, 720, weak, broad.

Example XXIII

A. A mixture of 8 g. of $B_{10}H_{14}$ and the adduct

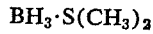

from 50 ml. of $(CH_3)_2S$ and $B_2H_6$, is processed as described in Example B to obtain a product containing $[H_2B \cdot 2S(CH_3)_2]B_{12}H_{11} \cdot S(CH_3)_2$. The quantity of product so obtained is dissolved in 100 ml. of dichloromethane and 10 ml. of N,N'-dimethylpiperazine is added to the solution. The temperature of the solution, which is 26° C., rises to 35° C. The mixture is stirred 0.5 hour and a fine white solid precipitates. The product is separated to obtain 9.3 g. of N,N'-dimethylpiperazinedihydroboron (1+) dimethyl sulfide-undecahydrodecaborate(−). Further processing of the filtrate yields an additional 3.8 g. of the compound. The compound is further purified by recrystallization from aqueous solution.

*Analysis.*—Calc'd for

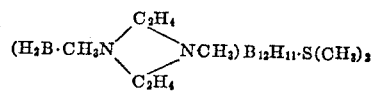

C, 29.11; H, 10.11; N, 8.49; B, 42.61; S, 9.71. Found: C, 29.5; H, 10.2; N, 8.09, 8.39; B, 42.3; S, 9.78.

The infrared spectrum of the compound shows bands at the following wavelengths (expressed as cm.$^{-1}$): 2500, strong, sharp; 2400 (shoulder); 1480, very weak, sharp; 1420, medium, sharp; 1370, medium, sharp; 1330, weak, sharp; 1290, weak, sharp; 1220, medium, sharp; 1190, very weak, sharp; 1170, medium, sharp; 1140, medium, sharp; 1120 (shoulder); 1110, strong, sharp; 1070, weak, sharp; 1045, medium, sharp; 1020, weak, sharp; 1000, weak, sharp; 965, medium, sharp; 930, 915, very weak, sharp; 890, medium, sharp; 830, medium, broad; 770, weak, broad; 720, medium, broad.

B. The compound (5.2 g.) of Part A is dissolved in water and the aqueous solution is passed through a column filled with a commercial chloride-ion exchange resin. The effluent is an aqueous solution of

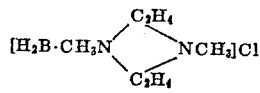

C. The effluent of Part B is evaporated to a small volume and an aqeosu solution of $NH_4PF_6$ is added with stirring. The precipitate which forms is separated and recrystallized to obtain 1.8 g. of N,N'-dimethylpiperazinedihydroboron(1+) hexafluorophosphate. The identity of the compound is confirmed by elemental analysis and its infrared spectrum.

*Analysis.*—Calc'd for

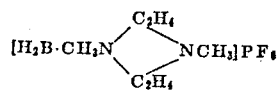

C, 26.49; H, 5.93; N, 10.30; P, 11.39. Found (average): C, 27.1; H, 6.69; N, 9.98; P, 11.1.

The infrared spectrum of the compound shows obsorption bands at the following wavelengths (expressed as cm.$^{-1}$): 2500, medium, sharp; 2400, weak, sharp; 2340, weak, sharp; 1300, weak, sharp; 1240, weak, sharp; 1220, medium, sharp; 1180, medium, sharp; 1150, weak, sharp; 1120, strong, sharp; 1020, medium, sharp; 965, weak, sharp; and 850, strong, very broad.

Examples XXI–XXIII illustrate the cation-containing compounds as prepared from boron-sulfur reactants. The examples which follow illustrate substitution products of the cationic boron-containing and the exceptional resistance to degradation of the compounds in vigorous chemical reactions.

Example XXIV

A reaction vessel is charged with an aqueous solution containing 2 g. of the hydrate of $[H_2B \cdot 2N(CH_3)_3]Cl$, and fluorine gas, diluted with about 5–10 nitrogen, is bubbled into the mixture at prevailing atmospheric temperature (about 25° C.). The vessel is cooled during this operation to maintain the temperature at 20–25° C. Passage of gas is continued until a $PF_6$-salt prepared from an aliquot portion of the reaction mixture shows substantial absence of the B—H bond in the infrared absorption spectrum. At this point passage of fluorine gas is discontinued and an aqueous solution of $NH_4PF_6$ is added with stirring to the reaction mixture. The white precipitate which forms is separated by filtration and it is recrystallized twice from water to obtain 0.49 g. of a white salt which consists of $[ClBF \cdot 2N(CH_3)_3]PF_6$ and $[F_2B \cdot 2N(CH_3)_3]PF_6$. An aqueous solution of this salt is passed through a column packed with a chloride anion exchange resin (described in Example XX) and the effluent is evaporated to yield 0.3–0.4 g. of a white solid which is a mixture of $[ClBF \cdot 2N(CH_3)_3]Cl$ and $[F_2B \cdot 2N(CH_3)_3]Cl$.

The infrared absorption spectrum shows only a trace of bands attributable to absorption by B—H bonds and the nuclear $F^{19}$ magnetic resonance spectrum in aqueous solution shows two sets of symmetrical quadruplets, one centered at $\delta = 95.0$ p.p.m. from tetrachloro-1,2-difluoroethane with a $J_{B-F}$ value of 133–150 c.p.s., the second at $\delta = 106$ p.p.m. from tetrachloro-1,2-difluoroethane with a $J_{B-F}$ value of 45 c.p.s.

Example XXV

A reaction vessel is charged with an aqueous solution containing 1.5 g. of hydrated $[H_2B \cdot 2N(CH_3)_3]Cl$. Fluorine gas, diluted with 5–15% nitrogen, is bubbled into the aqueous solution until it is present in excess. An aqueous solution of $NH_4PF_6$ is then added to the mixture with stirring until precipitation of a white solid is complete. The precipitate is separated by filtration to yield 0.7 g. of a product which is principally $[FClB \cdot 2N(CH_3)_3]PF_6$. The product contains about 10% of $[F_2B \cdot 2N(CH_3)_3]PF_6$. It is recrystallized from water to obtain 0.5 g. of white needles. The filtrate is retained for use in the next example.

*Analysis.*—calc'd for 90% $[FClB \cdot 2N(CH_3)_3]PF_6$–10% $[F_2B \cdot 2N(CH_3)_3]PF_6$: Cl, 9.76; P, 9.48; C, 22.05; H, 5.55; B, 3.31; F, 41.27. Found: Cl, 9.40; P, 9.5; C, 22.8; H, 5.6; B, 3.0; F, 41.43.

The compound is soluble in polar organic solvents, e.g., acetonitrile.

Example XXVI

The mother liquor from the second recrystallization of the compound of Example XXV is passed through a column packed with a chloride anion exchange resin of the type described in Example XX. The effluent is evaporated to yield 0.05 g. of a compound which is principally $[FClB \cdot 2N(CH_3)_3]Cl$ containing about 10% of

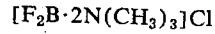

The product is a white crystalline solid. The nuclear magnetic proton resonance spectrum is a singlet, $\delta = 2.0$ p.p.m. from water.

The infrared absorption spectrum shows the following band in a Nujol mull (expressed as cm.$^{-1}$) and exclusive of bands coincidental with Nujol): 1480, strong, sharp; 1400, weak, sharp; 1330–1310, multiplet, medium, broad; 1180, 1140, medium, sharp; 1120, very weak, sharp; 1080, 1050, weak, sharp; 1020, medium, sharp; 970–950, doublet, medium, sharp; 870–830, with shoulders, strong, broad; 740–720, doublet, very weak, broad.

Example XXVII

A reaction vessel is charged with about 20 ml. of water and 1 g. of the hydrate of $[H_2B \cdot 2N(CH_3)_3]Cl$. The mixture is heated to boiling and chlorine gas is passed through it for 15 minutes at the boiling temperature. The solution contains $[HClB \cdot 2N(CH_3)_3]Cl$. The solution is cooled and added with stirring to an aqueous solution of $HAuCl_4$. An orange precipitate forms which is separated by filtration. The product is $$[HClB \cdot 2N(CH_3)_3]AuCl_4$$

and it is further purified by recrystallization from water. The identity of the compound is confirmed by elemental analysis.

*Analysis.*—Calc'd for $[HClB \cdot 2N(CH_3)_3]AuCl_4$: B, 2.14; C, 14.29; H, 3.80; N, 5.55; M.W., 504. Found: B, 2.58; C, 15.59; H, 4.49; N 5.62; M.W., 503, 523.

The compound is soluble in halogenated hydrocarbons, e.g., methylene dichloride and ethylene dichloride.

Example XXVIII

A reaction vessel, fitted with a reflux condenser, is charged with 10–25 ml. of concentrated nitric acid and 1 g. of the hydrate of $[H_2B \cdot 2N(CH_3)_3]Cl$, prepared as described in Example XX. The mixture is boiled until evolution of brown vapors subsides; 2–5 ml. of aqueous 5 M hydrochloric acid solution is added and the solution is boiled again for a few minutes. The solution is cooled and it is made slightly basic by addition of aqueous 30% sodium hydroxide. It is heated to boiling to expel a trace of trimethylamine and then made slightly acidic by addtion of hydrochloric acid. An aqueous solution containing 3 g. of $NH_4PF_6$ is added with stirring and the white precipitate which forms is crystallized by heating the mixture. The precipitate is separated by filtration and purified by recrystallization from water to give 1.15 g. of $[HClB \cdot 2N(CH_3)_3]PF_6$. The identity of the compound is confirmed by elemental analysis and by its infrared absorption spectrum.

*Analysis.*—Calc'd for $[HClB \cdot 2N(CH_3)_3]PF_6$: B, 3.48; C, 23.21; H, 6.17; N, 9.02; F, 36.72; P, 9.98; Cl, 11.42. Found: B, 3.0; C, 23.5; H, 6.4; N, 9.01, 9.00; F, 36.2; P, 9.9; Cl, 10.7.

The infrared absorption spectrum of the compound in a Nujol mull shows the following bands (expressed as cm.$^{-1}$ and exclusive of bands which are coincidental with Nujol): 2500, weak, sharp; 1500, 1480, shoulders, medium, sharp; 1400, medium, sharp; 1300, very weak, sharp; 1240–1220, doublet, medium, sharp; 1170, 1140, 1120, 1100, medium, sharp; 1060, strong, sharp; 975–960, doublet, strong, sharp; 880, weak, sharp; 850–830, strong, broad; 780, 760, very weak, broad; 730, weak, broad.

The compound is soluble in acetonitrile.

Example XXIX

A portion of the compound $[HClB \cdot 2N(CH_3)_3]PF_6$, obtained as described in Example XXVIII is dissolved in water and the solution is passed through a column packed with a chloride anion exchange resin of the type described in Example XX. The effluent is evaporated to yield 0.63 g. of $[HClB \cdot 2N(CH_3)_3]Cl$, a white crystalline solid.

In aqueous solution the nuclear $B^{11}$ magnetic resonance spectrum of the compound consists of a symmetrical doublet, a $J_{B-H}$ value of 134 c.p.s., $\delta = 17.3$ p.p.m. from trimethyl borate. The compound is soluble in a number of polar organic solvents, e.g., acetonitrile.

Example XXX

A reaction vessel is charged with 15 ml. of iodine monochloride and 3 g. of $[H_2B \cdot 2N(CH_3)_3]Cl$ is added in small portions with stirring. The initial reaction is exothermic and, after it subsides, the mixture is heated to 85° C. for one hour. The mixture is cooled and it is extracted with carbon disulfide to remove iodine and unreacted iodine monochloride. The solid which remains is dissolved in water and a solution of $NH_4PF_6$ is added with stirring. A crystalline solid precipitates which is separated by filtration and recrystallized twice from hot water. The compound which is obtained is bis(trimethylamine)dichloroboron (1+) hexafluorophosphate. Its identity is confirmed by elemental analysis and the infrared absorption spectrum.

*Analysis.*—Calc'd for $[BCl_2 \cdot 2N(CH_3)_3]PF_6$: P, 8.99; Cl, 20.5; H, 5.37. Found: P, 9.06; Cl, 20.79; H, 5.48.

The infrared absorption spectrum of a Nujol mull of the compound shows the following bands (expressed as microns and exclusive of bands due to Nujol): 6.7, 7.2; 8.25, 8.95, 9.5, 10.35, 10.55, 10.72, 11.4, 11.95, 13.00, and about 13.7.

Example XXXI

A reaction vessel is charged with 0.425 g. of the hydrate of $[H_2B \cdot 2N(CH_3)_3]Cl$, a small quantity of water and liquid bromine. The mixture is boiled until it is colorless. A further quantity of liquid bromine is added and a brown oily precipitate forms. The mixture is boiled until the oily precipitate is gone and it is then cooled to prevailing atmospheric temperature. About one-half of it is passed through a column packed with a chloride anion exchange resin ("Amberlite" IRA-400, chloride form). The effluent is evaporated to leave about 0.1 g. of a white crystalline compound which is $[HBrB \cdot 2N(CH_3)_3]Cl$. The nuclear $B^{11}$ magnetic resonance spectrum of this compound consists of a symmetrical doublet and the $J_{B-H}$ value is 134 c.p.s., $\delta = +12.2$ p.p.m. from trimethyl borate.

Example XXXII

The compound of Example XXXI, i.e., bis(trimethylamine)monohydromonobromoboron(1+) chloride, is dissolved in water and an aqueous solution of $HAuCl_4$ is added with stirring. A yellow solid precipitates which is separated by filtration. The product, which is $[HBrB \cdot 2N(CH_3)_3]AuCl_4$, is purified by recrystallization from water. The identity of the compound is confirmed by elemental analysis and by its infrared absorption spectrum.

*Analysis.*—Calc'd for $[HBrB \cdot 2N(CH_3)_3]AuCl_4$: B, 1.97; C, 13.13; H, 3.49; N, 5.10. Found: B, 2.06; C, 13.72; H, 3.80; N, 5.24, 5.14.

The infrared absorption spectrum of the compound in a Nujol mull shows the following bands (expressed as cm.$^{-1}$ and exclusive of bands which coincide with bands due to Nujol): 2500, medium, sharp; 1480–1430, shoulders; 1400, weak, sharp; 1230, shoulders, medium, sharp; 1160, medium, sharp; 1040, strong, broad; 970, 955, doublet, strong, sharp; 835, strong, broad; and 750, 730, 710, weak, broad.

The compound dissolves readily in methylene dichloride and ethylene dichloride.

Example XXXIII

A. A reaction vessel is charged with approximately 1 g. of the hydrate of $[H_2B \cdot 2N(CH_3)_3]Cl$ and about 1–2 ml. of bromine. The mixture is refluxed until it is colorless and a clear solution is obtained. The solution is passed through a column packed with a chloride anion exchange resin as described in Example XX. The effluent, which is acidic, is neutralized with aqueous sodium hydroxide. The neutral solution is partially evaporated and an aqueous solution of $NH_4PF_6$ is added with stirring. The white precipitate which forms is separated by filtration to obtain 1.87 g. of $[HBrB \cdot 2N(CH_3)_3]PF_6$. The compound is recrystallized from water and its identity is confirmed by elemental analysis, nuclear magnetic resonance and infrared absorption spectra.

*Analysis.*—Calc'd for $[HBrB \cdot 2N(CH_3)_3]PF_6$: C, 20.30; B, 3.05; N, 7.89; Br, 22.52; P, 8.73; F, 32.12; H, 5.40. Found: C, 20.51; B, 2.63; N, 7.83, 8.00; Br, 22.69; P, 8.79; F, 32.00; H, 5.83.

The infrared absorption spectrum of the compound in a Nujol mull shows the following bands (expressed as cm.$^{-1}$ and exclusive of bands coincident with the Nujol spectrum): 2500, weak, sharp; 1480, medium, sharp; 1400, medium, sharp; 1290, very weak; 1260, very weak; 1230–1220, doublet, strong, sharp; 1160, strong, sharp; 1130, medium, sharp; 1120, medium, sharp; 1090, medium, sharp; 1030, strong, sharp; 960–950, doublet, strong, sharp; 875, medium, sharp; 850–830, very strong, broad; 775, 755, 740, 725, 710, and 680, weak, sharp.

The compound dissolves readily in acetonitrile.

B. A reaction vessel, equipped with a reflux condenser, is charged with 40 ml. of liquid bromine and 2 g. of [H$_2$B·2N(CH$_3$)$_3$]Cl is added in small portions with stirring. After the initial reaction, which is exothermic, subsides the mixture is heated to reflux temperature for one hour. The mixture is cooled and maintained under reduced pressure until unreacted bromine is removed. The residue is dissolved in water and an aqeous solution of NH$_4$PF$_6$ is added with stirring. A crystalline solid precipitates which is separated by filtration to yield about 4.4 g. of [HBrB·2N(CH$_3$)$_3$]PF$_6$. The infrared absorption spectrum is identical with the spectrum of the compound obtained in Part A.

*Example XXXIV*

A. A reaction vessel is charged with about 4 ml. of peroxysulfuryl difluoride, i.e. S$_2$O$_6$F$_2$ [see Wannegat and Minnesken, Z. anorg. u. allgem. Chem. 278, 310–25 (1955)], and about 0.5 g. of [H$_2$B·2N(CH$_3$)$_3$]PF$_6$, prepared as described in Example XI–C by using

[H$_2$B·2N(CH$_3$)$_3$]Cl is added in small portions with stirring. An exothermic reaction sets in and brown fumes are released; with addition of a larger portion of the boron reactant, a vigorous puffing reaction develops and charring occurs with loss of a substantial quantity of the reaction mixture. The portion which remains is collected and agitated with water. A white, insoluble product is separated by filtration and it is crystallized from hot water to obtain about 0.14 g. of bis(fluorosulfato)bis(trimethylamine)boron(1+) hexafluorophosphate in the form of transparent prisms. The identity is confirmed by elemental analysis.

*Analysis.*—Calculated for [(FSO$_3$)$_2$B·2N(CH$_3$)$_3$]PF$_6$: C, 15.2; H, 3.84; N, 5.94; S, 13.62. Found: C, 15.48; H, 3.97; N, 5.10, 5.28; S, 14.2.5, 13.00.

B. A reaction vessel is charged with about 20 ml. of hexafluoropropene dimer, i.e., perfluorodimethylcyclobutane, containing 2–4 ml. of S$_2$O$_6$F$_2$. About 1 g. of [H$_2$B·2N(CH$_3$)$_3$]PF$_6$, prepared as described in Example XI–C by using [H$_2$B·2N(CH$_3$)$_3$]Cl instead of

[H$_2$B·2N(CH$_3$)$_2$C$_2$H$_5$]Cl is added to the solution and the resulting slurry is stirred for about 3 hours at prevailing atmospheric temperature (about 25° C.). The mixture becomes dark and a gummy solid forms which, with continued stirring, becomes granular. At the end of 3 hours, water is added to the mixture with stirring and the dark solid which is present is separated by filtration. An aqueous solution of ammonium hexafluorophosphate is added to the filtrate with stirring and the white precipitate which forms is separated by filtration to yield 0.45 g. of the compound of Part A, i.e., [(FSO$_3$)$_2$B·2N(CH$_3$)$_3$]PF$_6$. The product is further purified by recrystallization from hot water containing a small quantity of ammonium acid difluoride (NH$_4$HF$_2$) to obtain 0.175 g. of the compound as transparent crystals. The analyses are as follows: C, 15.67; H, 4.00; N, 5.86, 5.77; S, 13.64, 13.71; P, 6.66, 6.07; F, 31.65. These values compare favorably with the calculated values given in Part A.

The dark solid, isolated previously in the filtration step, is dissolved in hot water containing NH$_4$HF$_2$. The solution is cooled and crystals form which are separated to yield 0.40 g. of [(FSO$_3$)$_2$B·2N(CH$_3$)$_3$]PF$_6$. The infrared absorption spectrum of the compounds isolated in Part A and in this part, taken in a Nujol mull, shows the following bands (exclusive of the bands coincident with Nujol and expressed as cm.$^{-1}$): 1480, medium, sharp; 1440, strong, sharp; 1240, strong, sharp; 1215, medium, sharp; 1120, very weak, sharp; 1080, strong, broad; 1040, strong, broad; 960, medium, broad; 940, very weak, sharp; 895, medium, sharp; 840, strong, broad; 820, medium, sharp; and 740, 720, weak, broad.

The compound, when burned, shows the green color characteristic for boron. It possesses excellent resistance to hydrolysis. It is sparingly soluble in polar organic solvents, e.g., acetonitrile, but dissolves readily in aqueous solutions of polar organic liquids.

Passage of an alcoholic solution of

[(FSO$_3$)$_2$B·2N(CH$_3$)$_3$]PF$_6$ through a column charged with a chloride ion exchange resin, as described in Example XX, yields an alcohol solution of [(FSO$_3$)$_2$B·2N(CH$_3$)$_3$]Cl. Evaporation of the solution to dryness yields the chloride in solid form.

*Example XXXV*

Liquid bromine (excess) is added to a small portion of the effluent obtained as described in Example XXIII, Part B. The effluent contains

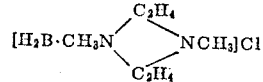

The mixture is boiled to remove excess bromine. The solution at this point contains

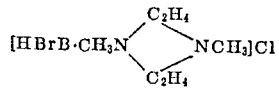

An aqueous solution of NH$_4$PF$_6$ is added to the solution and the solid which forms is separated, washed and dried. The product is N,N'-dimethylpiperazine-monobromo-monohydroboron(1+) hexafluorophosphate.

*Analysis.*—Calc'd for

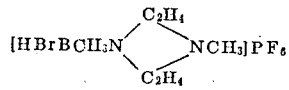

Br, 22.77; C, 20.53; H, 4.31; P, 8.83. Found: Br, 22.11; C, 21.20, 21.46; H, 4.71, 4.69; P, 8.75, 8.75.

The infrared spectrum of the compound shows bands at the following wavelengths (expressed as cm.$^{-1}$): 2550, weak, sharp; 1340, weak, sharp; 1300, medium, sharp; 1230, medium, sharp; 1180, medium, sharp; 1160, weak, sharp; 1100, strong, sharp; 1000, weak, sharp; 940, weak, sharp; 850, very strong, broad; 735, weak, sharp; 710 medium, sharp.

*Example XXXVI*

A 20-ml. sample of 0.8 M H$_2$B[N(CH$_3$)$_3$]$_2$$^+$OH$^-$ was neutralized with aqueous hydrogen fluoride in a polyethylene beaker cooled to 0°. A 1:1 mixture of fluorine and nitrogen was passed into the solution (ca. 3 l./hr.). Aliquots were removed at intervals, treated with aqueous NH$_4$PF$_6$, and the infrared spectrum of the salt was checked. Fuorination was continued for a total of 98 min., at which time the B—H absorption in the infrared spectrum had disappeared. The solution was neutralized and treated with aqueous NH$_4$PF$_6$. The precipitate was recrystallized from hot water to give 2.0 g. (37%) of F$_2$B[N(CH$_3$)$_3$]$_2$$^+$PF$_6$$^-$ as white needles, M.P. 174–176°.

*Analysis.*—Calculated for F$_2$B[N(CH$_3$)$_3$]$_2$$^+$PF$_6$$^-$: C, 23.1; H, 5.8; N, 9.0; P, 9.9; F, 48.7. Found: C, 23.5; H, 6.4; N, 9.0; P, 9.8; F, 47.7.

The F$^{19}$ n.m.r. spectrum of the product in acetonitrile consisted of a quadruplet due to the cation ($\delta_{BF}=37$ c.p.s.) and a doublet due to $PF_6^-$.

*Example XXXVII*

A 10-ml. portion of 0.8 M aqueous $$H_2B[N(CH_3)_3]_2^+OH^-$$

was neutralized with aqueous hydrogen fluoride and the solution was fluorinated as described in the preceding example. Fluorination was continued for 40 min., at which time the infrared spectra of aliquots had reached a transition point and remained constant for 10 minutes. Changes in the infrared were the collapse of the B—H doublet to a weak singlet (with shoulder), complete disappearance of the 1000 cm.$^{-1}$ band, and the appearance of a more or less symmetrical triplet centered at 1180 cm.$^{-1}$. The reaction solution was then neutralized with 20% NaOH and filtered, and the filtrate was treated with concentrated aqueous $NH_4PF_6$. The precipitate was recrystallized from hot water to yield $$HFB[N(CH_3)_3]_2^+PF_6^-$$

as white crystals, M.P. 159–160°.

*Analysis.*—Calc'd for $HFB[N(CH_3)_3]_2^+PF_6^-$: C, 24.5; H, 6.5; N, 9.5; F, 45.2; P, 10.5. Found: C, 24.3; H, 6.5; N, 9.3; F, 45.6; P, 10.1.

The $F^{19}$ n.m.r. spectrum of the product showed it to contain some $F_2B \cdot 2N(CH_3)_2PF_6$ since a quartet due to $F_2B[N(CH_3)_3]_2^+$ was found. The $F^{19}$ resonance of $HFB \cdot 2N(CH_3)_2^+$ was an unresolved multiplet centered at 117 p.p.m. in which both BF and HF splitting are to be expected.

All of the products containing the substituted cations described in Examples XXIV through XXXVII can be obtained as the chloride, if needed, by employing the chloride ion-exchange technique. The chlorides are converted to free bases by reaction with freshly washed $Ag_2O$. By using the processes described in these examples, compounds of the following formulas are obtained:

[HBrB·2N(CH$_3$)$_3$]OH, [HClB·2N(CH$_3$)$_3$]OH, [FClB·2N(CH$_3$)$_3$]OH, [F$_2$B·2N(CH$_3$)$_3$]OH, [HBF·2N(CH$_3$)$_3$]OH, and [(FSO$_3$)$_2$B·2N(CH$_3$)$_3$]OH.

Bases of the type illustrated above can be neutralized with a wide variety of acids to provide compounds in which Z represents a wide range of anions of the type illustrated in previous paragraphs.

Many of the salts of the general formula $$[BH_{2-y'}X'_{y'}mCH_3NR^{IV}R^V]_{n1}Z$$

are water-soluble. They are readily obtained in solution by mixing an aqueous solution of a salt containing the appropriate cation Z, with an aqueous solution of $BH_{2-y'}X'_{y'}mCH_3NR^{IV}R^VCl$, as illustrated below.

| Reagent Mixed | Product Formed |
|---|---|
| KClO$_4$ | [BCl$_2$·2N(CH$_3$)$_3$]ClO$_4$ |
| HCl+FeCl$_3$ | [BFCl·2N(CH$_3$)$_3$]FeCl$_4$ |
| HCl+AlCl$_3$ | [BHBr·2N(CH$_3$)$_3$]AlCl$_4$ |
| KNO$_3$ | [BCl$_2$·2N(CH$_3$)$_3$]NO$_3$ |
| KIO$_3$ | [BBr$_2$·2N(CH$_3$)$_3$]IO$_3$ |
| H$_2$PtCl$_6$ | [BHCl·2N(CH$_3$)$_3$]$_2$PtCl$_6$ |
| NaBH$_4$ | [BHCl·2N(CH$_3$)$_3$]BH$_4$ |
| NaI | [BF$_2$·2N(CH$_3$)$_3$]I |
| KBr | [BCl$_2$·2N(CH$_3$)$_3$]Br |
| NaHCO$_3$ | [BF$_2$·2N(CH$_3$)$_3$]HCO$_3$ |
| Na$_2$CO$_3$ | [BHCl·2N(CH$_3$)$_3$]$_2$CO$_3$ |
| HCl+HgCl$_2$ | [BHCl·2N(CH$_3$)$_3$]HgCl$_3$ |
| Na$_2$B$_{10}$H$_{10}$ | [BCl$_2$·2N(CH$_3$)$_3$]$_2$B$_{10}$H$_{10}$ |
| Ammoniacal NH$_4$Cr(SCN)$_4$ | [BF$_2$·2N(CH$_3$)$_3$][Cr(SCN)$_4$(NH$_3$)$_2$] |
| K$_2$Cr$_2$O$_7$ | [BHCl·2N(CH$_3$)$_3$]$_2$Cr$_2$O$_7$ |
| H$_2$C$_2$O$_4$ | [BHCl·2N(CH$_3$)$_3$]$_2$C$_2$O$_4$ |
| Na$_3$PO$_4$ | [BCl$_2$·2N(CH$_3$)$_3$]$_3$PO$_4$ |

The novel classes of compounds of this invention are generally useful as sequestering agents for metals, especially heavy metals. For example, the admixture of an aqueous solution of $HAuCl_4$ to an aqueous solution of [HClB·2N(CH$_3$)$_3$]Cl results in the precipitation of [HClB·2N(CH$_3$)$_3$]AuCl$_4$, a solid which can be separated by conventional means, e.g., filtration or decantation. In addition, a mixture of hydrocarbons in the boiling range of gasoline, which contains in solution a copper salt of an organic acid (copper stearate) can be thoroughly agitated with an aqueous ammoniacal solution of $NaB_{12}H_{11}N(C_2H_5)_3$. The hydrocarbon layer, which is separated from the aqueous reagent, is completely free of the deleterious copper salt.

Thus, copper, nickel, cobalt, zinc and cadmium are removed from aqueous solutions of salts containing these metals by mixing the solutions with an ammoniacal solution of an alkali metal or an alkaline earth metal salt of the $B_{12}H_{11}NR^IR^{II}$ anion, e.g., the sodium, potassium, lithium, cesium, calcium or magnesium salts of the $B_{12}H_{11}N(C_2H_5)_3$ anion. The ammonium, tetraalkylammonium, trialkylsulfonium, tetraalkylphosphonium salts and, in general, the nitrogen-base salts, are also useful in the field of sequestering agents to remove undesirable metals from aqueous or hydrocarbon media.

The dodecahydrododecaborates(2—) can be used as sequestering agents for metals, as described in the preceding paragraphs.

The acids $HB_{12}H_{11-y}X_y \cdot NRR^IR^{II}$ are useful for recovering by-product amines from waste solutions or waste gases. To illustrate, a by-product solution of N-methyl-cyclohexylamine is contacted with an aqueous solution of $HB_{12}H_{11}N(C_2H_5)_3$ and the amine is recovered as an insoluble salt of the anion. The acids in aqueous solution are useful in metal processing operations, e.g., in scale removal and as agents for etching metals.

The salts of the novel anion-containing compounds can be employed to prepare the corresponding acids which are useful as shown above.

The trialkylammonium salts, e.g., $$(C_2H_5)_3NHB_{12}H_{11}N(C_2H_5)_3$$

fluoresce under ultraviolet light. Salts possessing this property are useful as components of marking inks employed for identification purposes.

Salts of the general formula $$[BH_{2-y'}X'_{y'} \cdot 2CH_3NR^{IV}R^V]_n \cdot Z$$

can be converted to the free base by contacting aqueous solutions of the salt with a basic ion-exchange resin. The base is a strong base in aqueous solution and these solutions are useful in neutralizing acidic products or in scavenging such products from atmospheres which contain them.

All of the compounds of the invention in which the anion Z is a group other than —OH can be used as intermediates in the preparation of compounds of the formula $[BH_{2-y'}X'_{y'} \cdot mCH_3NR^{IV}R^V]OH$ by processes described in the examples. The compounds of this formula are strong bases and in aqueous or alcohol solutions they are useful as agents for absorbing acidic gases. For example, an aqueous solution of $[F_2B \cdot 2N(CH_3)_3]OH$ absorbs $CO_2$, HCl, HBr, $H_2S$, $SO_2$, and the like, from volatile by-products of chemical reactions.

The novel cation-containing compounds are generically useful as impregnating agents for cellulosic compositions to aid combustion and to provide shaped residues useful in the preparation of resistors. To illustrate, a section of cellulose string is immersed in a methylene chloride solution of $[H_2B \cdot 2N(CH_3)_3]_2B_{12}H_{12}$ for a short period. The string is withdrawn from the solution and the solvent is removed by air-drying. A free flame is applied to the dried impregnated string and it burns easily. The residue from the impregnated string, after burning, has a size and shape similar to the original string and the residual skeleton is of sufficient coherence to permit embedding in paraffin. The section of residue, so treated, has a resistance of about 100 ohms/inch. The residue from a control section of string (untreated) is very small and it cannot be handled.

The new classes of compounds described in the invention, including products having the novel cations and the novel anions, are useful as combustible components of compositions employed in fireworks displays to impart a pleasing color to the display.

The invention therefore provides a simple, economical method for obtaining valuable classes of compounds which find applications in many fields.

As many apparently widely different embodiments of this invention may be made without departing from the spirit and scope thereof, it is to be understood that this invention is not limited to the specific embodiments thereof except as defined in the appended claims.

The embodiments of the invention in which the exclusive property or privilege is claimed are defined as follows:

1. A compound of the formula $$M(B_{12}H_{11-y}X_yNRR^IR^{II})_n$$

wherein

M is a cation of valence 1–4 inclusive;

X is halogen;

R and $R^I$ are selected from the class consisting of (1) individually, aliphatically saturated hydrocarbon of 1 through 18 carbon atoms, and (2) joined together, a divalent group selected from the class consisting of alkylene of 4 through 6 carbon atoms, ethereal oxygen-interrupted alkylene of 4 through 6 carbon atoms, and loweralkylamino-interrupted alkylene of 4 through 6 carbon atoms, which forms a ring with the amino nitrogen of the $NRR^IR^{II}$ moiety;

$R^{II}$ is aliphatically saturated hydrocarbon of 1 through 18 carbon atoms which can contain up to one diloweralkylamino substituent located on a carbon at least once removed from the carbon bonded to the amino nitrogen of the $NRR^IR^{II}$ moiety; said R, $R^I$ and $R^{II}$ groups being bonded to the amino nitrogen of the $NRR^IR^{II}$ moiety by a saturated aliphatic carbon;

y is a cardinal number of from 0 through 11; and n is a positive whole number equal to the valence of M.

2. The compound of claim 1 wherein M is a metal.
3. The compound of claim 1 wherein M is hydrogen.
4. A compound of the formula $$M(B_{12}H_{11} \cdot NRR^IR^{II})_n$$

wherein

M is a cation of valence 1–4 inclusive;

R, $R^I$ and $R^{II}$ are each aliphatically saturated hydrocarbon of 1 through 18 carbon atoms bonded to the amino nitrogen of the $NRR^IR^{II}$ moiety by a saturated aliphatic carbon; and n is a positive whole number equal to the valence of M.

5. The compound of claim 4 wherein M is $RR^IR^{II}NH$, wherein R, $R^I$ and $R^{II}$ are defined as in claim 4.

6. The compound of claim 4 wherein M is hydrogen.

7. The compound of claim 4 wherein R, $R^I$ and $R^{II}$ are alkyl groups of 1 through 8 carbon atoms.

8. A compound of the formula $$[BH_{2-y'}X'_{y'} \cdot mCH_3NR^{IV}R^V][B_{12}H_{11-y}X_y \cdot CH_3NR^{IV}R^V]$$

wherein $R^{IV}$ and $R^V$ are selected from the class consisting of (1) individually, alkyl groups of 1 through 4 carbon atoms in which $R^{IV}$ can contain a dimethylamino substituent located on a carbon at least once removed from the carbon bonded to the amino nitrogen of the $CH_3NR^{IV}R^V$ moiety, and (2) joined together, a divalent group of the formula $-CH_2CH_2QCH_2CH_2-$ wherein Q is of the class consisting of $-CH_2-$ and $-N(CH_3)-$; $R^{IV}$ and $R^V$ being bonded to the amino nitrogen of the $CH_3NR^{IV}R^V$ moiety by carbon bonded to at most one other carbon atom;

X is halogen;

X' is of the group consisting of halogen and fluorosulfato;

y is a cardinal number of 0 through 11;

y' is a cardinal number of 0 through 2; and m is a positive whole number equal to 2 divided by the number of nitrogens in the $CH_3NR^{IV}R^V$ moiety.

9. The compound of claim 8 wherein $R^{IV}$ and $R^V$ are alkyl of 1 through 4 carbon atoms bonded to the amino nitrogen of the $CH_3NR^{IV}R^V$ moiety by a carbon bonded to at most one other carbon atom; y and y' are each 0; and m is 2.

10. A compound of the formula $$[BH_{2-y'}X'_{y'} \cdot mCH_3NR^{IV}R^V]_{n'} \cdot Z$$

wherein $R^{IV}$ and $R^V$ are selected from the class consisting of (1) individually, alkyl groups of 1 through 4 carbon atoms in which $R^{IV}$ can contain a dimethylamino substituent located on a carbon at least once removed from the carbon bonded to the amino nitrogen of the $CH_3NR^{IV}R^V$ moiety, and (2) joined together, a divalent group of the formula $-CH_2CH_2QCH_2CH_2-$ wherein Q is of the class consisting of $-CH_2-$ and $-N(CH_3)_2-$; $R^{IV}$ and $R^V$ being bonded to the amino nitrogen of the $CH_3NR^{IV}R^V$ moiety by a carbon bonded to at most one other carbon atom;

X' is selected from the group consisting of halogen and fluorosulfato;

y' is a cardinal number of 1 through 2;

m is a positive whole number equal to 2 divided by the number of nitrogens in the $CH_3NR^{IV}R^V$ moiety;

Z is an anion; and n' is a positive whole number equal to the valence of Z.

11. The compound of claim 10 wherein $R^{IV}$ and $R^V$ are methyl groups and m is 2.

12. $(CH_3)_3NHB_{12}H_{11}N(CH_3)_3$.
13. $[BH_2 \cdot 2N(CH_3)_3][B_{12}H_{11}N(CH_3)_3]$.
14. $HB_{12}H_{11}N(CH_3)_3$.
15. $(C_2H_5)_3NHB_{12}H_{11}N(C_2H_5)_3$.
16. $[BCl_2 \cdot 2N(CH_3)_3]Cl$.
17. $[BH_2 \cdot (CH_3)_2NCH_2CH_2N(CH_3)_2]_2B_{12}H_{12}$.

18. Process for the formation of polyhydrododecaborates which comprises heating at a temperature in the range of 75° to 400° C. a member of the group consisting of diborane, pentaborane and decaborane with a tertiary amine-borane adduct of the formula $$RR^IR^{II}N-BH_3$$

wherein

R and $R^I$ are selected from the class consisting of (1) individually, aliphatically saturated hydrocarbon of 1 through 18 carbon atoms, and (2) joined together, a divalent group selected from the class consisting of alkylene of 4 through 6 carbon atoms, ethereal oxygen-interrupted alkylene of 4 through 6 carbon atoms, and loweralkylamino-interrupted alkylene of 4 through 6 carbon atoms, which forms a ring with the amino nitrogen of the $NRR^IR^{II}$ moiety;

$R^{II}$ is aliphatically saturated hydrocarbon of 1 through 18 carbon atoms which can contain up to one diloweralkylamino substituent located on a carbon at least once removed from the carbon bonded to the amino nitrogen of the $NRR^IR^{II}$ moiety;

said R, $R^I$ and $R^{II}$ groups being bonded to the amino nitrogen of the $NRR^IR^{II}$ moiety by a saturated aliphatic carbon.

19. The process of claim 18 wherein the adduct is formed in situ by treating diborane with the tertiary amine $RR^IR^{II}N$, wherein R, $R^I$ and $R^{II}$ are defined as in claim 18, at a temperature in the range of −80° C. to 35° C.

20. Process for the formation of polyhydrododecaborates which comprises heating at a temperature in the range of 75° to 400° C. a member of the group consisting of diborane, pentaborane and decaborane with a tertiary amine-borane adduct of the formula $$RR^IR^{II}N-BH_3$$

wherein R, $R^I$ and $R^{II}$ are alkyl groups of 1 through 8 carbon atoms.

21. The process of claim 20 wherein R, $R^I$ and $R^{II}$ are methyl groups.

22. Process for the formation of a compound of the formula $$[BH_2 \cdot 2N(CH_3)_3]B_{12}H_{11}N(CH_3)_3$$

which comprises heating at a temperature in the range of 100° to 300° C. diborane with trimethylamine-borane adduct, and isolating the resulting product.

23. Process which comprises contacting a member of the class consisting of $(BH_2 \cdot mCH_3NR^{IV}R^V)_2B_{12}H_{12}$ and $(BH_2 \cdot mCH_3NR^{IV}R^V)(B_{12}H_{11} \cdot CH_3NR^{IV}R^V)$ wherein $m$ is a positive whole number of from 1–2 whose value is equal to 2 divided by the total number of nitrogen atoms in the $CH_3NR^{IV}R^V$ group; and $R^{IV}$ and $R^V$ are selected from the class consisting of (1) individually, alkyl groups of 1 through 4 carbon atoms in which $R^{IV}$ can contain a dimethylamino substituent located on a carbon at least once removed from the carbon bonded to the amino nitrogen of the $CH_3NR^{IV}R^V$ moiety, and (2) joined together, a divalent group of the formula $$-CH_2CH_2QCH_2CH_2-$$

wherein Q is of the class consisting of $-CH_2-$ and $-N(CH_3)-$; $R^{IV}$ and $R^V$ being bonded to the amino nitrogen of the $CH_3NR^{IV}R^V$ moiety by a carbon bonded to at most one other carbon atom; with a strongly basic ion-exchange resin, and isolating the resulting $$(BH_2 \cdot mCH_3NR^{IV}R^V)OH$$

24. Process which comprises reacting a compound selected from the class consisting of $$(BH_2 \cdot mCH_3NR^{IV}R^V)OH$$

and $(BH_2 \cdot mCH_3NR^{IV}R^V)Cl$ wherein $m$ is a positive whole number of from 1–2 whose value is equal to 2 divided by the total number of nitrogen atoms in the $CH_3NR^{IV}R^V$ moiety; and $R^{IV}$ and $R^V$ are selected from the class consisting of (1) individually, alkyl groups of 1 through 4 carbon atoms in which $R^{IV}$ can contain a dimethylamino substituent located on a carbon at least once removed from the carbon bonded to the amino nitrogen of the $CH_3NR^{IV}R^V$ moiety, and (2) joined together, a divalent group of the formula $-CH_2CH_2QCH_2CH_2-$ wherein Q is of the class consisting of $-CH_2-$ and $-N(CH_3)-$; $R^{IV}$ and $R^V$ being bonded to the amino nitrogen of the $CH_3NR^{IV}R^V$ moiety by a carbon bonded to at most one other carbon atom; with an acid containing a water-soluble anion, Z, whereupon methathesis occurs to produce a compound having the formulas $$(BH_2 \cdot mCH_3NR^{IV}R^V)_n \cdot Z$$

where $n'$ is a positive whole number equal to the valence of Z.

25. Process which comprises reacting a compound selected from the class consisting of $$[BH_2 \cdot 2S(CH_3)_2][B_{12}H_{11} \cdot S(CH_3)_2]$$

and $$[BH_2 \cdot 2S(CH_3)_2]_2B_{12}H_{12}$$

with a tertiary amine of the formula $CH_3NR^{IV}R^V$ wherein $R^{IV}$ and $R^V$ are selected from the class consisting of (1) individually, alkyl groups of 1 through 4 carbon atoms in which $R^{IV}$ can contain a dimethylamino substituent located on a carbon at least once removed from the carbon bonded to the amino nitrogen of the $CH_3NR^{IV}R^V$ moiety, and (2) joined together, a divalent group of the formula $-CH_2CH_2QCH_2CH_2-$ wherein Q is of the class consisting of $-CH_2-$ and $-N(CH_3)-$; $R^{IV}$ and $R^V$ being bonded to the amino nitrogen of the $CH_3NR^{IV}R^V$ moiety by a carbon bonded to at most one other carbon atom, and isolating the resulting products.

26. Process which comprises reacting a compound of the formula $$(BH_2 \cdot mCH_3NR^{IV}R^V)_n \cdot Z$$

wherein $m$ is a positive whole number of from 1–2 whose value is equal to 2 divided by the total number of nitrogen atoms in the $CH_3NR^{IV}R^V$ moiety; Z is an anion; $n'$ is a positive whole number whose value is equal to the numerical value of the ionic charge on Z; and $R^{IV}$ and $R^V$ are selected from the class consisting of (1) individually, alkyl groups of 1 through 4 carbon atoms in which $R^{IV}$ can contain a dimethylamino substituent located on a carbon at least once removed from the carbon bonded to the amino nitrogen of the $CH_3NR^{IV}R^V$ moiety, and (2) joined together, a divalent group of the formula $$-CH_2CH_2QCH_2CH_2-$$

wherein Q is of the class consisting of $-CH_2-$ and $-N(CH_3)-$; $R^{IV}$ and $R^V$ being bonded to the amino nitrogen of the $CH_3NR^{IV}R^V$ moiety by a carbon bonded to at most one other carbon atom, with a reagent selected from the class consisting of halogen and peroxysulfuryl difluoride, and isolating the resulting product.

No references cited.

CHARLES H. PARKER, *Primary Examiner.*

CARL D. QUARFORTH, *Examiner.*

L. A. SEBASTIAN, R. L. RAYMOND,
*Assistant Examiners.*